US009095774B2

(12) United States Patent
Noge

(10) Patent No.: US 9,095,774 B2
(45) Date of Patent: Aug. 4, 2015

(54) COMPUTER-READABLE STORAGE MEDIUM HAVING PROGRAM STORED THEREIN, APPARATUS, SYSTEM, AND METHOD, FOR PERFORMING GAME PROCESSING

(75) Inventor: Tetsuya Noge, Kai (JP)

(73) Assignees: Nintendo Co., Ltd., Kyoto (JP); Hal Laboratory Inc., Tokyo (JP)

( * ) Notice: Subject to any disclaimer, the term of this patent is extended or adjusted under 35 U.S.C. 154(b) by 0 days.

(21) Appl. No.: 13/159,865

(22) Filed: Jun. 14, 2011

(65) Prior Publication Data

US 2012/0077582 A1 Mar. 29, 2012

(30) Foreign Application Priority Data

Sep. 24, 2010 (JP) ................................ 2010-214170

(51) Int. Cl.
*A63F 9/00* (2006.01)
*A63F 13/20* (2014.01)

(52) U.S. Cl.
CPC ......... *A63F 13/06* (2013.01); *A63F 2300/1093* (2013.01); *A63F 2300/204* (2013.01); *A63F 2300/6676* (2013.01); *A63F 2300/69* (2013.01); *A63F 2300/8035* (2013.01)

(58) Field of Classification Search
None
See application file for complete search history.

(56) References Cited

U.S. PATENT DOCUMENTS

| 6,020,891 | A | 2/2000 | Rekimoto |
| 6,853,935 | B2* | 2/2005 | Satoh et al. ..................... 702/94 |
| 8,345,001 | B2* | 1/2013 | Yamamoto et al. ........... 345/157 |
| 8,419,545 | B2* | 4/2013 | Yen et al. ......................... 463/42 |
| 8,594,376 | B2* | 11/2013 | Ogasawara et al. ........... 382/103 |
| 2002/0095265 | A1* | 7/2002 | Satoh et al. ...................... 702/94 |
| 2003/0166413 | A1* | 9/2003 | Hayashida et al. ............. 463/30 |
| 2007/0060383 | A1 | 3/2007 | Dohta |
| 2008/0030459 | A1* | 2/2008 | Kouno .......................... 345/156 |
| 2008/0058100 | A1* | 3/2008 | Kouno ............................ 463/31 |
| 2009/0174652 | A1* | 7/2009 | Yamamoto et al. ........... 345/156 |
| 2009/0221368 | A1* | 9/2009 | Yen et al. ........................ 463/32 |
| 2009/0221374 | A1* | 9/2009 | Yen et al. ........................ 463/42 |
| 2010/0099492 | A1 | 4/2010 | Kamiya |
| 2011/0175801 | A1* | 7/2011 | Markovic et al. ............. 345/156 |
| 2012/0068980 | A1* | 3/2012 | Kitahara et al. .............. 345/207 |
| 2012/0075285 | A1* | 3/2012 | Oyagi et al. ................... 345/419 |
| 2012/0075424 | A1* | 3/2012 | Kawamoto et al. ............. 348/46 |
| 2012/0075430 | A1* | 3/2012 | Ito et al. ......................... 348/47 |
| 2012/0079426 | A1* | 3/2012 | Jin et al. ........................ 715/810 |
| 2012/0094773 | A1* | 4/2012 | Suzuki ............................ 463/43 |
| 2012/0257787 | A1* | 10/2012 | Ogasawara et al. ........... 382/103 |

FOREIGN PATENT DOCUMENTS

| JP | H10-051711 | 2/1998 |
| JP | 2006-72667 | 3/2006 |
| JP | 2006-072669 | 3/2006 |
| JP | 2007-75353 A | 3/2007 |
| JP | 2009-131291 | 6/2009 |

* cited by examiner

*Primary Examiner* — Seng H Lim
(74) *Attorney, Agent, or Firm* — Nixon & Vanderhye, P.C.

(57) ABSTRACT

A storage medium has stored therein a game program that in game processing, controls a correlation between a player object and a non-player object through a virtual surface that is set on the basis of a marker for generating a superimposed image by combining a real world image and a virtual world image. The game program causes a computer of an apparatus, which includes a display device for providing the superimposed image to a user and an imaging section for taking an image of the marker, to operate as predetermined means.

13 Claims, 14 Drawing Sheets

(THIRD POSITION)

(FIRST POSITION)

LEFT REAL WORLD IMAGE

RIGHT REAL WORLD IMAGE

DEVIATION DUE TO PARALLAX

ORIGIN OF LEFT VIRTUAL CAMERA COORDINATE SYSTEM

ORIGIN OF MARKER COORDINATE SYSTEM

COMPUTER-READABLE STORAGE MEDIUM HAVING PROGRAM STORED THEREIN, APPARATUS, SYSTEM, AND METHOD, FOR PERFORMING GAME PROCESSING

CROSS REFERENCE TO RELATED APPLICATION

The disclosure of Japanese Patent Application No. 2010-214170, filed on Sep. 24, 2010, is incorporated herein by reference.

BACKGROUND OF THE INVENTION

1. Field of the Invention

The present invention relates to a computer-readable storage medium having a program stored therein, an apparatus, a system, and a method, for performing game processing. Specifically, the present invention relates to a computer-readable storage medium having a game program stored therein, an apparatus and a system using the storage medium, and a method, for, in game processing, combining perception information obtained from a real space and information generated in a virtual space.

2. Description of the Background Art

In recent years, researches have been progressing concerning Augmented Reality (AR) technique in which a virtual object is displayed as if being present in the real world, by being synthesized with a taken image of the real world and displayed.

A game apparatus using this AR technique is also known. For example, such a game apparatus detects, as a visual marker, a game card included in an image taken by a camera, and calculates a positional relation between the camera and the game card on the basis of the detection result (e.g., see Japanese Laid-Open Patent Publication No. 2006-072667 (hereinafter, referred to as Patent Document 1)). Then, the game apparatus generates, on the basis of the calculation result, an image in which an image of a virtual object is superimposed on a taken image, to generate a superimposed image in which the virtual object is located on the game card in the taken image, and displays the superimposed image.

As exemplified in Patent Document 1, an object appearing in the game is merely displayed so as to be superimposed on the game card, which is the marker, or in a limited region along the surface of the game card (e.g., the character moves so as to follow movement of the game card). Thus, for the conventional game apparatus using the AR technique, there is still room for improvements in providing extension of representation as the game to enhance fun.

SUMMARY OF THE INVENTION

Therefore, an object of the present invention is to provide a computer-readable storage medium having a game program stored therein, an apparatus, a system, and a method, which can provide more extension of representation as a game than ever to enhance fun.

In order to attain the object mentioned above, the present invention can be provided, as an example, in the following aspects. The following specific description is in all aspects illustrative for the understanding of the extent of the present invention, and is not intended to be limited thereto. That is, it is understood that, from the specific description, the one skilled in the art can implement the present invention in the equivalent range based on the description of the present invention and on the common technological knowledge.

In one aspect of the present invention, a computer-readable storage medium having a game program stored therein is provided. The game program causes a computer of a game apparatus, which is connected to an imaging device and a display device that allows a real space to be viewed on a screen thereof, to operate as taken image obtaining means, detection means, calculation means, virtual camera setting means, virtual surface setting means, first virtual object control means, virtual object image generation means, display control means, second virtual object control means, and game progress means.

The taken image obtaining means obtains a taken image obtained by the imaging device taking an image of the real space. The detection means detects a specific object from the taken image obtained by the taken image obtaining means. The calculation means calculates a relative position of the imaging device and the specific object on the basis of a detection result of the specific object. The virtual camera setting means sets a virtual camera in a virtual space on the basis of the relative position. The virtual surface setting means sets, on the basis of the relative position, a virtual surface in the virtual space to define subspaces of the virtual space. The first virtual object control means provides, on the basis of a position of the virtual camera, a first virtual object in a first subspace of the virtual space that is defined by the virtual surface. The virtual object image generation means generates a virtual object image by taking, by the virtual camera, the virtual space including the first virtual object. The display control means displays the virtual object image on the display device such that the virtual object image is superimposed on the real space on the screen and viewed by a user. The second virtual object control means provides a second virtual object different from the first virtual object, in the virtual space in accordance with a progress of a game. The game progress means controls the progress of the game in accordance with changing a positional relation of either one of the first virtual object or the second virtual object or both of them with respect to the virtual surface.

In one embodiment, the game progress means may perform a determination of a condition concerning a correlation between the first virtual object and the second virtual object for subsequent game processing.

In another embodiment, when at least a part of the first virtual object that is present in the first subspace is moved through the virtual surface into a second subspace that is farther away from the virtual camera than the virtual surface, the game progress means may perform a determination of a condition concerning a correlation between the first virtual object and the second virtual object for subsequent game processing.

In another embodiment, the condition concerning the correlation may be that a positional relation of the first virtual object and the second virtual object satisfies a predetermined condition.

In still another embodiment, the condition concerning the correlation may be that a moving amount of the first virtual object that is defined on the basis of the relative position obtained by the calculation means reaches a predetermined value. Alternatively, the condition concerning the correlation may be that even when the moving amount does not reach a predetermined value, the detection means does not detect the specific object from the taken image.

In still another embodiment, a three-dimensional model represented as a virtual object extending from the virtual camera side toward the specific object side may be provided to the first virtual object.

In another embodiment, the display control means may display the virtual surface that is set by the virtual surface setting means, on the basis of a three-dimensional model that is located on the basis of a position of the specific object, and the three-dimensional model may be defined by a polygon having a surface to which the taken image is mapped.

In another embodiment, when the second virtual object control means locates one or more second virtual objects in the virtual space other than the first subspace, the display control means may display the one or more second virtual objects on the screen by blending a texture representing a shape of each of the one or more second virtual objects, with a texture of the taken image that is mapped to a polygon for representing the virtual surface.

In still another embodiment, the second virtual object control means may have a tendency to locate the second virtual object in a region between the specific object and the virtual camera in the virtual space.

In another embodiment, when the second virtual object control means provides the second virtual object in the virtual space and at least a part of the second virtual object is moved from a space different from the first subspace through the virtual surface into the first subspace and located therein, the game progress means may perform a determination of a condition concerning a correlation between the first virtual object and the second virtual object and may perform subsequent game processing in accordance with a result of the determination.

In another embodiment, the condition concerning the correlation may be that in a determination of collision between at least a part of the first virtual object and the second virtual object, it is determined that these virtual objects have collided with each other.

In addition, in another aspect, the computer-readable storage medium, described above, having the game program stored therein may be used as an apparatus executing the game program, or as a system including one or more apparatuses that can communicate with each other. Further, the present invention includes a method that can be implemented in the computer-readable storage medium having the game program stored therein, the apparatus, or the system.

As used herein, the term "computer-readable storage medium" indicates any apparatus or medium capable of storing a program, a code, and/or data to be used in a computer system. The computer-readable storage medium may be any one of a volatile device and a nonvolatile device as long as it can be read by a computer system. Examples of computer-readable storage media include a magnetic tape, a hard disc drive (HDD), a compact disc (CD), a digital versatile disc (DVD), a Blu-ray disc (BD), a semiconductor memory, but the present invention is not limited thereto.

As used herein, the term "system" (for example, a game system, or an information processing system) may include one apparatus, or may include a plurality of apparatuses each of which can communicate with another one of the apparatuses.

The storage medium and the like according to the present invention can provide more extension of representation as a game than ever to enhance fun.

These and other objects, features, aspects and advantages of the present invention will become more apparent from the following detailed description of the present invention when taken in conjunction with the accompanying drawings.

DESCRIPTION OF THE PREFERRED EMBODIMENTS (Example of Structure of Game Apparatus)

Figure 1:
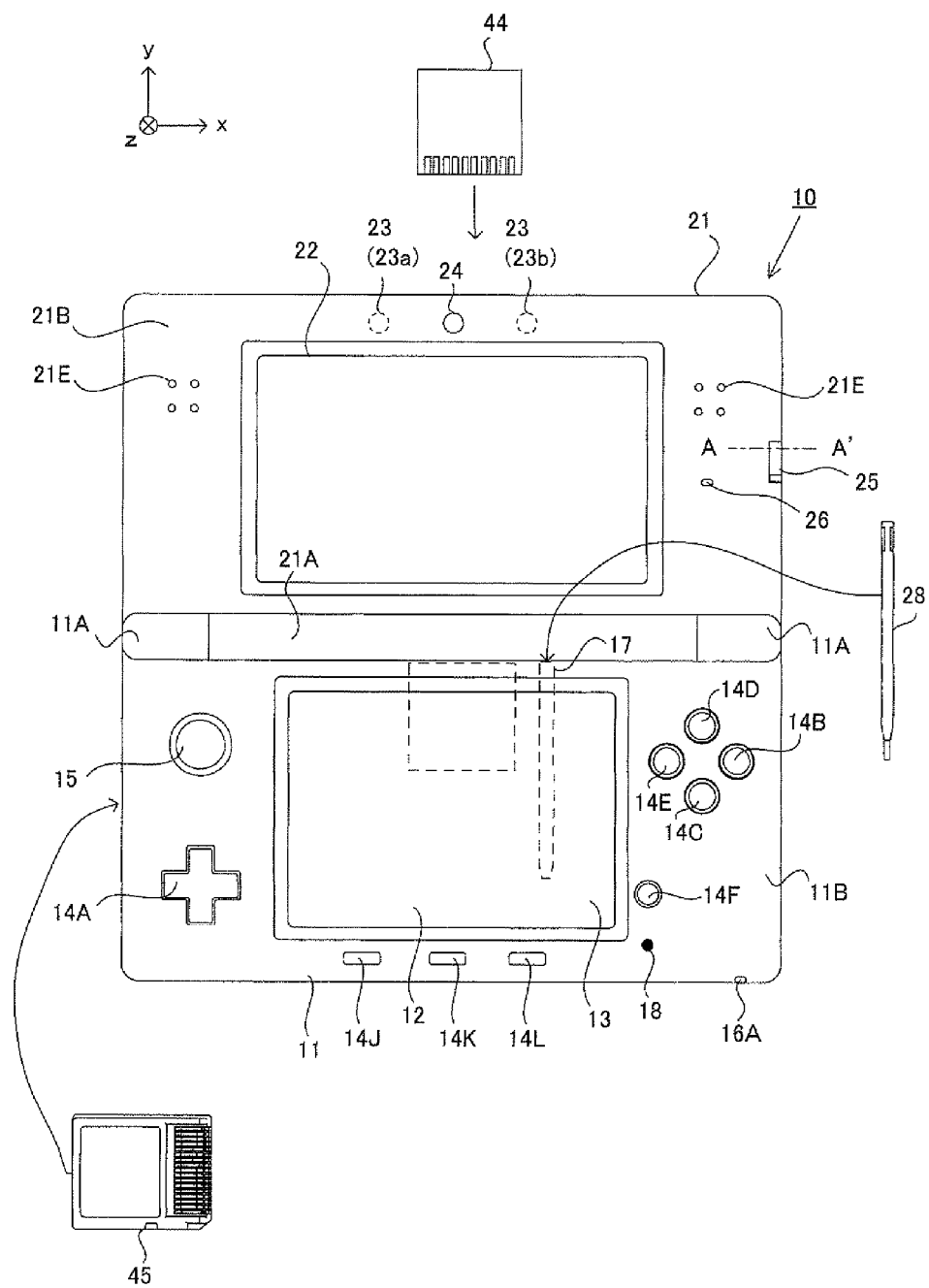
FIG. 1 is a front view of a game apparatus 10 in an opened state.
Figure 2:
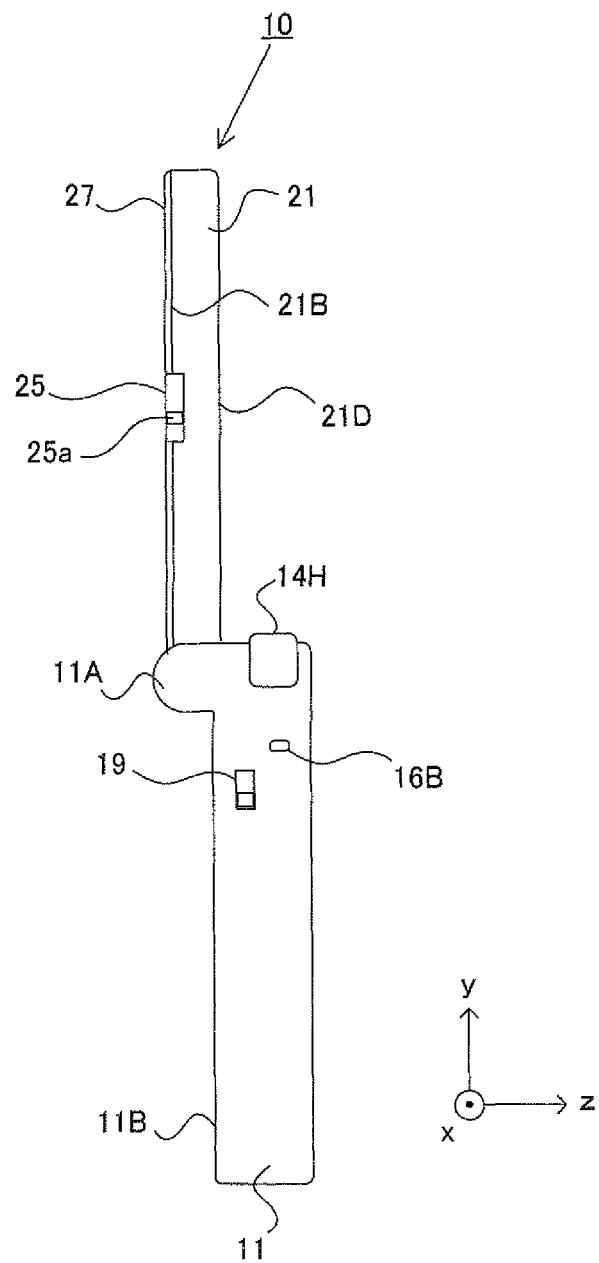
FIG. 2 is a side view of the game apparatus 10 in the opened state.
Figure 3:
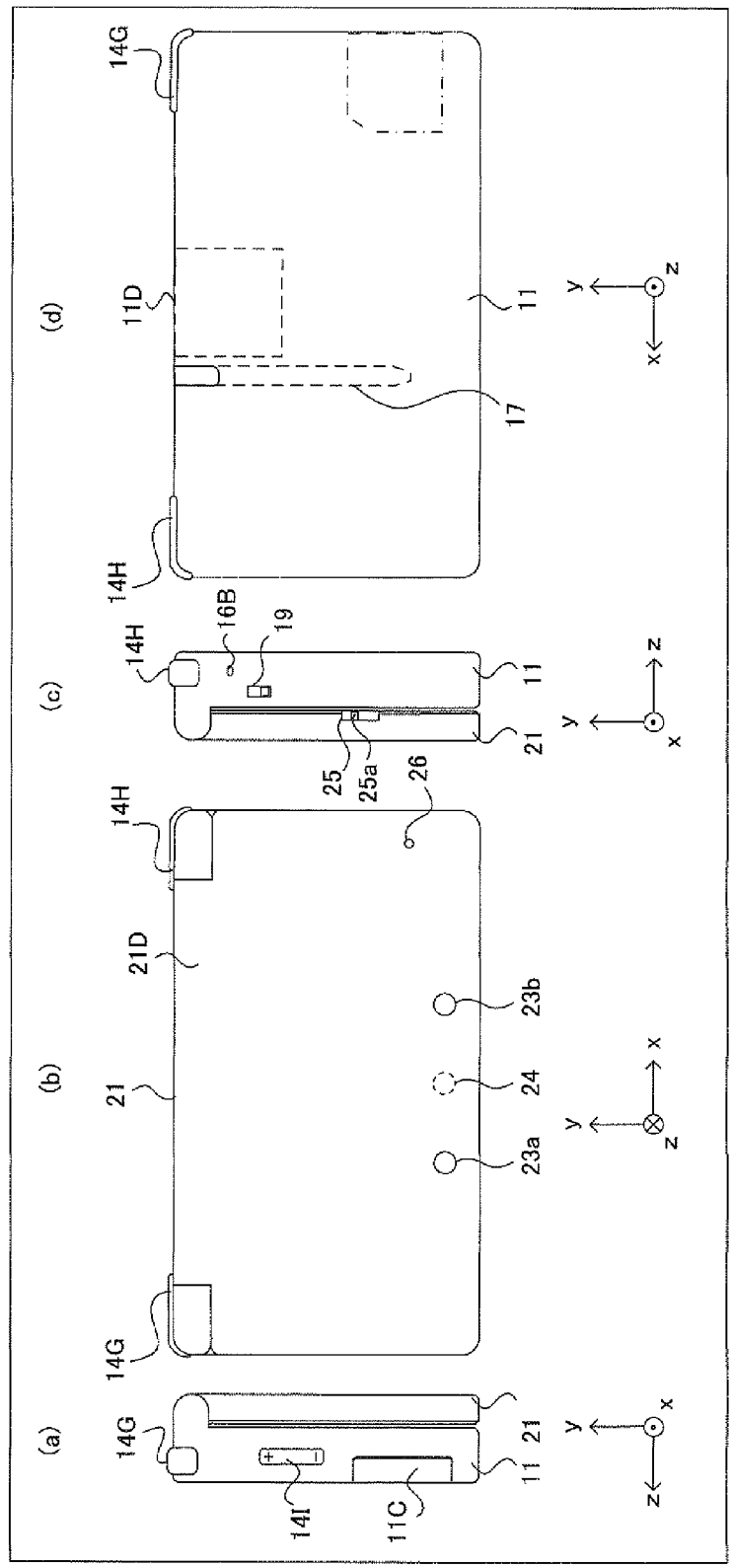
FIG. 3 is a left side view, a front view, a right side view, and a rear view of the game apparatus 10 in a closed state.

Hereinafter, a game apparatus according to one exemplified embodiment of the present invention will be described. FIGS. 1 to 3 are each a plan view of an outer appearance of a game apparatus 10. The game apparatus 10 is a hand-held game apparatus, and is configured to be foldable as shown in FIGS. 1 to 3. FIGS. 1 and 2 show the game apparatus 10 in an opened state, and FIG. 3 shows the game apparatus 10 in a closed state. FIG. 1 is a front view of the game apparatus 10 in the opened state, and FIG. 2 is a right side view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIGS. 1 to 3. The game apparatus 10 includes a lower housing 11 and an upper housing 21 as shown in FIGS. 1 to 3. The lower housing 11 and the upper housing 21 are connected to each other so as to be openable and closable (foldable). In the present embodiment, the lower housing 11 and the upper housing 21 are each formed in a horizontally long plate-like rectangular shape, and are connected to each other at long side portions thereof so as to be pivotable with respect to each other.

As shown in FIGS. 1 and 2, projections 11A each of which projects in a direction orthogonal to an inner side surface (main surface) 11B of the lower housing 11 are provided at the upper long side portion of the lower housing 11, whereas a projection 21A which projects from the lower side surface of the upper housing 21 in a direction orthogonal to the lower side surface of the upper housing 21 is provided at the lower long side portion of the upper housing 21. Since the projections 11A of the lower housing 11 and the projection 21A of the upper housing 21 are connected to each other, the lower housing 11 and the upper housing 21 are foldably connected to each other.

(Description of Lower Housing)

Initially, a structure of the lower housing 11 will be described. As shown in FIGS. 1 to 3, in the lower housing 11, a lower LCD (Liquid Crystal Display) 12, a touch panel 13, operation buttons 14A to 14L (FIG. 1, FIG. 3), an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening of the lower housing 11. When the game apparatus 10 is not used, the game apparatus 10 is in the closed state, thereby preventing the screen of the lower LCD 12 from becoming unclean and damaged. The number of pixels of the lower LCD 12 may be, for example, 256 dots×192 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 3(d)) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. As shown in FIG. 1, the cross button 14A is provided to the left of the lower LCD 12 in the lower portion of the lower housing 11. That is, the analog stick 15 is provided above the cross button 14A. The analog stick 15 and the cross button 14A are positioned so as to be operated by a thumb of a left hand with which the lower housing is held. Further, the analog stick 15 is provided in the upper area, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Four buttons, that is, the button 14B, the button 14C, the button 14D, and the button 14E, which are positioned so as to form a cross shape, are positioned such that a thumb of a right hand with which the lower housing 11 is held is naturally positioned on the positions of the four buttons. Further, the four buttons and the analog stick 15 sandwich the lower LCD 12, so as to be bilaterally symmetrical in position with respect to each other. Thus, depending on a game program, for example, a left-handed person can make a direction instruction input by using these four buttons.

Further, the microphone hole 18 is provided on the inner side surface of the lower housing 11. Under the microphone hole 18, a microphone (see FIG. 6) is provided as a sound input device described below, and the microphone detects for a sound from the outside of the game apparatus 10.

FIG. 3(a) is a left side view of the game apparatus 10 in the closed state. FIG. 3(b) is a front view of the game apparatus 10 in the closed state. FIG. 3(c) is a right side view of the game apparatus 10 in the closed state. FIG. 3(d) is a rear view of the game apparatus 10 in the closed state. As shown in FIG. 3(b) and FIG. 3(d), an L button 14G and an R button 14H are provided on the upper side surface of the lower housing 11. The L button 14G is positioned on the left end portion of the upper side surface of the lower housing 11 and the R button 14H is positioned on the right end portion of the upper side surface of the lower housing 11. The L button 14G and the R button 14H can act, for example, as shutter buttons (imaging instruction buttons) of the imaging section. Further, as shown in FIG. 3(a), a sound volume button 14I is provided on the left side surface of the lower housing 11. The sound volume button 14I is used for adjusting a sound volume of a speaker of the game apparatus 10.

As shown in FIG. 3(a), a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10. The connector and the cover section 11C may be provided on the right side surface of the lower housing 11.

Further, as shown in FIG. 3(d), an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10. The connector and the insertion opening 11D may be provided on another side surface (for example, the right side surface) of the lower housing 11.

Further, as shown in FIG. 1 and FIG. 3(c), a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 3(c)).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIGS. 1 to 3, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

The screen of the upper LCD 22 is provided on the inner side surface (main surface) 21B of the upper housing 21, and the screen of the upper LCD 22 is exposed at an opening of the upper housing 21. Further, as shown in FIG. 2, the inner side surface of the upper housing 21 is covered with a transparent screen cover 27. The screen cover 27 protects the screen of the upper LCD 22, and integrates the upper LCD 22 and the inner side surface of the upper housing 21 with each other, thereby achieving unity. The number of pixels of the upper LCD 22 may be, for example, 640 dots×200 dots (the horizontal line× the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye are displayed alternately in a time division manner may be used. Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23*a* and 23*b*) provided on the outer side surface (the back surface reverse of the main surface on which the upper LCD 22 is provided) 21D of the upper housing 21 are generically referred to as the outer imaging section 23. The imaging directions of the outer imaging section (left) 23*a* and the outer imaging section (right) 23*b* are each the same as the outward normal direction of the outer side surface 21D. Further, these imaging sections are each designed so as to be positioned in a direction which is opposite to the normal direction of the display surface (inner side surface) of the upper LCD 22 by 180 degrees. Specifically, the imaging direction of the outer imaging section (left) 23*a* and the imaging direction of the outer imaging section (right) 23*b* are parallel to each other. The outer imaging section (left) 23*a* and the outer imaging section (right) 23*b* can be used as a stereo camera depending on a program executed by the game apparatus 10. Further, depending on a program, when any one of the two outer imaging sections (23*a* and 23*b*) is used alone, the outer imaging section 23 may be used as a non-stereo camera. Further, depending on a program, images taken by the two outer imaging sections (23*a* and 23*b*) may be combined with each other or may compensate for each other, thereby enabling imaging using an extended imaging range. In the present embodiment, the outer imaging section 23 is structured so as to include two imaging sections, that is, the outer imaging section (left) 23*a* and the outer imaging section (right) 23*b*. Each of the outer imaging section (left) 23*a* and the outer imaging section (right) 23*b* includes an imaging device, such as a CCD image sensor or a CMOS image sensor, having a common predetermined resolution, and a lens. The lens may have a zooming mechanism.

As indicated by dashed lines in FIG. 1 and by solid lines in FIG. 3(*b*), the outer imaging section (left) 23*a* and the outer imaging section (right) 23*b* forming the outer imaging section 23 are aligned so as to be parallel to the horizontal direction of the screen of the upper LCD 22. Specifically, the outer imaging section (left) 23*a* and the outer imaging section (right) 23*b* are positioned such that a straight line connecting between the two imaging sections is parallel to the horizontal direction of the screen of the upper LCD 22. Reference numerals 23*a* and 23*b* which are indicated as dashed lines in FIG. 1 represent the outer imaging section (left) 23*a* and the outer imaging section (right) 23*b*, respectively, which are positioned on the outer side surface reverse of the inner side surface of the upper housing 21. As shown in FIG. 1, when a user views the screen of the upper LCD 22 from the front thereof, the outer imaging section (left) 23*a* is positioned to the left of the upper LCD 22 and the outer imaging section (right) 23*b* is positioned to the right of the upper LCD 22. When a program for causing the outer imaging section 23 to function as a stereo camera is executed, the outer imaging section (left) 23*a* takes an image for a left eye, which is viewed by a left eye of a user, and the outer imaging section (right) 23*b* takes an image for a right eye, which is viewed by a right eye of the user. A distance between the outer imaging section (left) 23*a* and the outer imaging section (right) 23*b* is set so as to be approximately the same as a distance between both eyes of a person, that is, may be set so as to be within a range from 30 mm to 70 mm, for example, However, the distance between the outer imaging section (left) 23*a* and the outer imaging section (right) 23*b* is not limited to a distance within the range described above.

In the present embodiment, the outer imaging section (left) 23*a* and the outer imaging section (right) 23*b* are secured to the housing, and the imaging directions thereof cannot be changed.

Further, the outer imaging section (left) 23*a* and the outer imaging section (right) 23*b* are positioned to the left and to the right, respectively, of the upper LCD 22 (on the left side and the right side, respectively, of the upper housing 21) so as to be horizontally symmetrical with respect to the center of the upper LCD 22. Specifically, the outer imaging section (left) 23*a* and the outer imaging section (right) 23*b* are positioned so as to be symmetrical with respect to a line which divides the upper LCD 22 into two equal parts, that is, the left part and the right part. Further, the outer imaging section (left) 23*a* and the outer imaging section (right) 23*b* are positioned at positions which are reverse of positions above the upper edge of the screen of the upper LCD 22 and which are on the upper portion of the upper housing 21 in an opened state. Specifically, when the upper LCD 22 is projected on the outer side surface of the upper housing 21, the outer imaging section (left) 23*a* and the outer imaging section (right) 23*b* are positioned, on the outer side surface of the upper housing 21, at a position above the upper edge of the screen of the upper LCD 22 having been projected.

As described above, the two imaging sections (23*a* and 23*b*) of the outer imaging section 23 are positioned to the left and the right of the upper LCD 22 so as to be horizontally symmetrical with respect to the center of the upper LCD 22. Therefore, when a user views the upper LCD 22 from the front thereof, the imaging direction of the outer imaging section 23 can be the same as the direction of the line of sight of the user. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIG. 1 and FIG. 3(*b*), the inner imaging section 24 is positioned on the inner side surface of the upper housing 21 at a position reverse of the middle position between the left and the right imaging sections (the outer imaging section (left) 23a and the outer imaging section (right) 23b) of the outer imaging section 23. Specifically, when the left and the right imaging sections of the outer imaging section 23 provided on the outer side surface of the upper housing 21 are projected on the inner side surface of the upper housing 21, the inner imaging section 24 is positioned at the middle position between the left and the right imaging sections having been projected. The dashed line 24 indicated in FIG. 3(b) represents the inner imaging section 24 positioned on the inner side surface of the upper housing 21.

As described above, the inner imaging section 24 is used for taking an image in the direction opposite to that of the outer imaging section 23. The inner imaging section 24 is positioned on the inner side surface of the upper housing 21 at a position reverse of the middle position between the outer imaging section (left) 23a and the outer imaging section (right) 23b. Thus, when a user views the upper LCD 22 from the front thereof, the inner imaging section 24 can take an image of a face of the user from the front thereof. Further, the left and the right imaging sections of the outer imaging section 23 do not interfere with the inner imaging section 24 inside the upper housing 21, thereby enabling reduction of the thickness of the upper housing 21.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. As shown in FIGS. 1 to 3, the 3D adjustment switch 25 is provided at the end portions of the inner side surface and the right side surface of the upper housing 21, and is positioned at a position at which the 3D adjustment switch 25 is visible to a user when the user views the upper LCD 22 from the front thereof. Further, an operation section of the 3D adjustment switch 25 projects on the inner side surface and the right side surface, and can be viewed and operated from both sides. All the switches other than the 3D adjustment switch 25 are provided on the lower housing 11.

Figure 4:
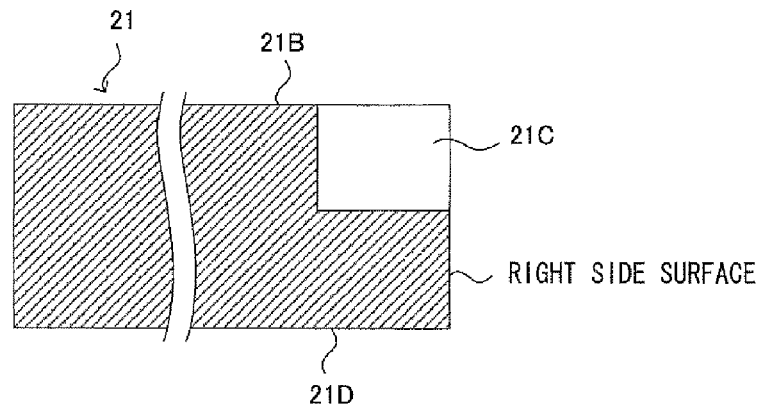
FIG. 4 is a cross-sectional view of an upper housing 21 shown in FIG. 1 along the line A-A'.

FIG. 4 is a cross-sectional view of the upper housing 21 shown in FIG. 1 taken along the line A-A'. As shown in FIG. 4, a recessed portion 21C is formed at the right end portion of the inner side surface of the upper housing 21, and the 3D adjustment switch 25 is provided in the recessed portion 21C. The 3D adjustment switch 25 is provided so as to be visible from the front surface and the right side surface of the upper housing 21 as shown in FIGS. 1 and 2. A slider 25a of the 3D adjustment switch 25 is slidable to any position in a predetermined direction (along the longitudinal direction of the right side surface), and a display mode of the upper LCD 22 is determined in accordance with the position of the slider 25a.

Figure 5A:
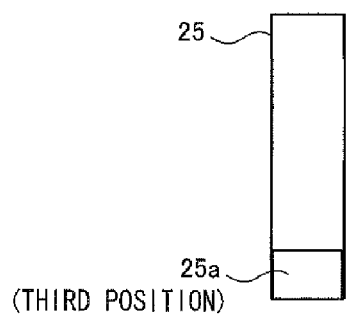
FIG. 5A is a diagram illustrating a state in which a slider 25a of a 3D adjustment switch 25 is positioned at a lowermost position (a third position)
Figure 5B:
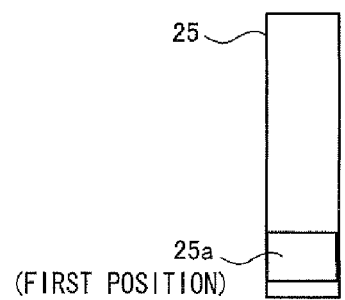
FIG. 5B is a diagram illustrating a state in which the slider 25a of the 3D adjustment switch 25 is positioned above the lowermost position (a first position)
Figure 5C:
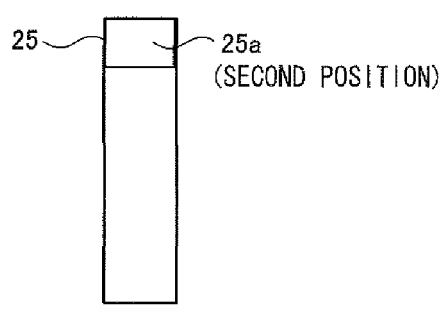
FIG. 5C is a diagram illustrating a state in which the slider 25a of the 3D adjustment switch 25 is positioned at an uppermost position (a second position)

FIG. 5A to FIG. 5C are each a diagram illustrating a state in which the slider 25a of the 3D adjustment switch 25 slides. FIG. 5A is a diagram illustrating a state in which the slider 25a of the 3D adjustment switch 25 is positioned at the lowermost position (a third position). FIG. 5B is a diagram illustrating a state in which the slider 25a of the 3D adjustment switch 25 is positioned above the lowermost position (a first position). FIG. 5C is a diagram illustrating a state in which the slider 25a of the 3D adjustment switch 25 is positioned at the uppermost position (a second position).

As shown in FIG. 5A, when the slider 25a of the 3D adjustment switch 25 is positioned at the lowermost position (the third position), the upper LCD 22 is set to the planar display mode, and a planar image is displayed on the screen of the upper LCD 22 (the upper LCD 22 may remain set to the stereoscopic display mode, and the same image may be used for the image for a left eye and the image for a right eye, to perform planar display). On the other hand, when the slider 25a is positioned between a position shown in FIG. 5B (a position (first position) above the lowermost position) and a position shown in FIG. 5C (the uppermost position (the second position)), the upper LCD 22 is set to the stereoscopic display mode. In this case, a stereoscopically visible image is displayed on the screen of the upper LCD 22. When the slider 25a is positioned between the first position and the second position, a manner in which the stereoscopic image is visible is adjusted in accordance with the position of the slider 25a. Specifically, an amount of deviation in the horizontal direction between a position of an image for a right eye and a position of an image for a left eye is adjusted in accordance with the position of the slider 25a. The slider 25a of the 3D adjustment switch 25 is configured so as to be fixed at the third position, and is slidable, along the longitudinal direction of the right side surface, to any position between the first position and the second position. For example, the slider 25a is fixed at the third position by a projection (not shown) which projects, from the side surface of the 3D adjustment switch 25, in the lateral direction shown in FIG. 5A, and does not slide upward from the third position unless a predetermined force or a force greater than the predetermined force is applied upward. When the slider 25a is positioned between the third position and the first position, the manner in which the stereoscopic image is visible is not adjusted, which is intended as a margin. In another embodiment, the third position and the first position may be the same position, and, in this case, no margin is provided. Further, the third position may be provided between the first position and the second position. In this case, a direction in which an amount of deviation in the horizontal direction between a position of an image for a right eye and a position of an image for a left eye is adjusted when the slider is moved from the third position toward the first position, is opposite to a direction in which an amount of deviation in the horizontal direction between the position of the image for the right eye and the position of the image for the left eye is adjusted when the slider is moved from the third position toward the second position.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed (namely, image processing in which an image for a left eye is different from an image for a right eye is performed in the case of the 3D adjustment switch being positioned between the first position and the second position) in a state where the upper LCD 22 is in the stereoscopic display mode. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 43 described below.

(Internal Configuration of Game Apparatus 10)

Figure 6:
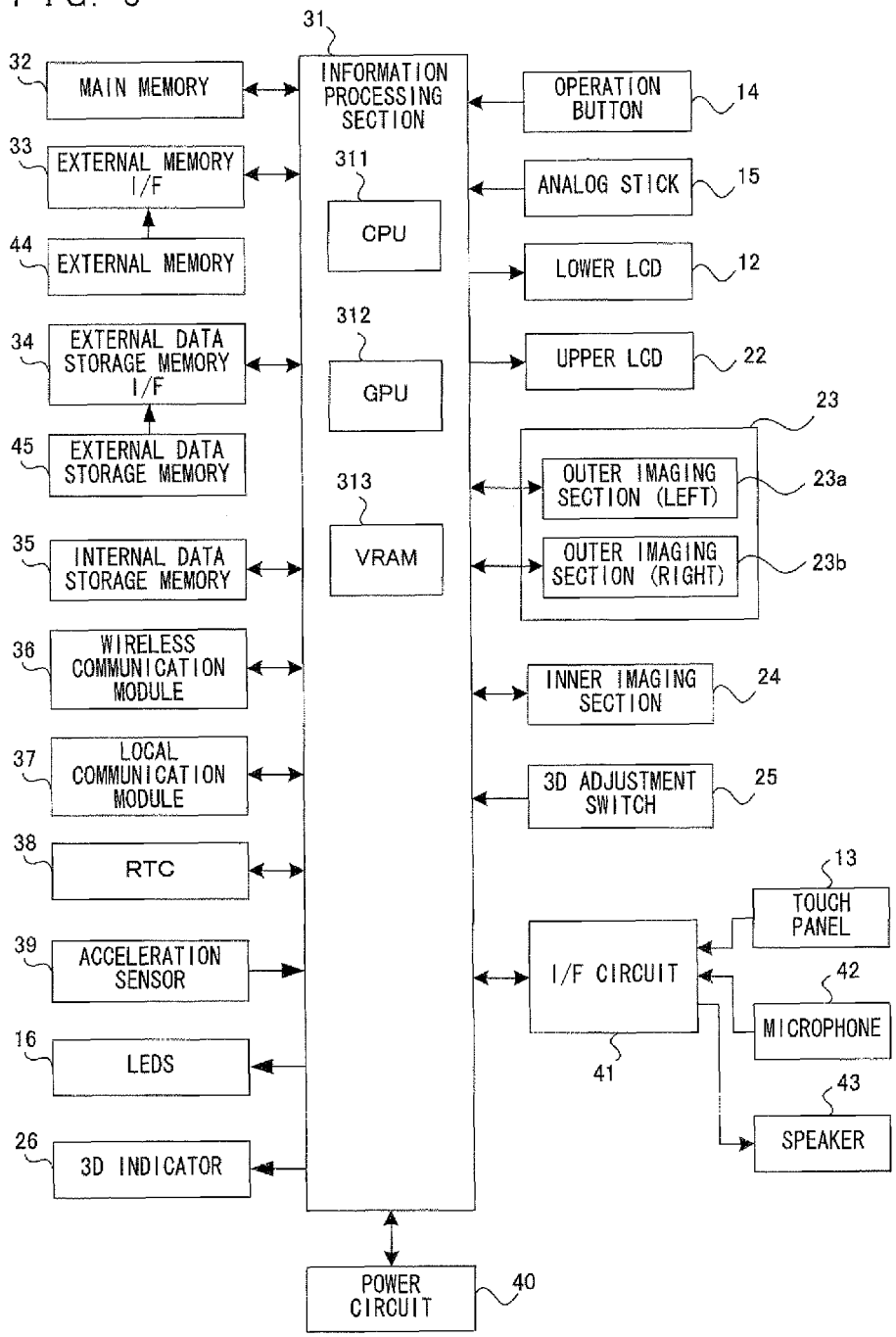
FIG. 6 is a block diagram illustrating an internal configuration of the game apparatus 10.

Next, an internal electrical configuration of the game apparatus 10 will be described with reference to FIG. 6. FIG. 6 is a block diagram illustrating an internal configuration of the game apparatus 10. As shown in FIG. 6, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) inside the game apparatus 10, thereby performing processing corresponding to the program (e.g., photographing processing and below-described game processing). The program executed by the CPU 311 of the information processing section 31 may be obtained from another device through communication with the other device. The information processing section 31 further includes a VRAM (Video RAM) 313. The GPU 312 of the information processing section 31 generates an image in accordance with an instruction from the CPU 311, and renders the image in the VRAM 313. The GPU 312 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the processing based on the above program, and temporarily stores a program obtained from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 obtains the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 obtains the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 12 to display a stereoscopic image (stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31 and output data of the taken image to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. The game apparatus 10 has the internal configuration as described above.

(Outline of Operation of Game Apparatus 10)

Hereinafter, an outline of an operation of the game apparatus 10 in the present embodiment will be described. In the present embodiment, on the basis of a game program 70 (see a memory map in FIG. 8), a synthesized image in which an image of the real world being currently taken by the outer imaging section 23 (the outer imaging section (left) 23a and the outer imaging section (right) 23b) is synthesized with an image of a virtual object present in a three-dimensional virtual space, is displayed on the screen of the upper LCD 22 such that the synthesized image is stereoscopically visible.

Figure 7A:
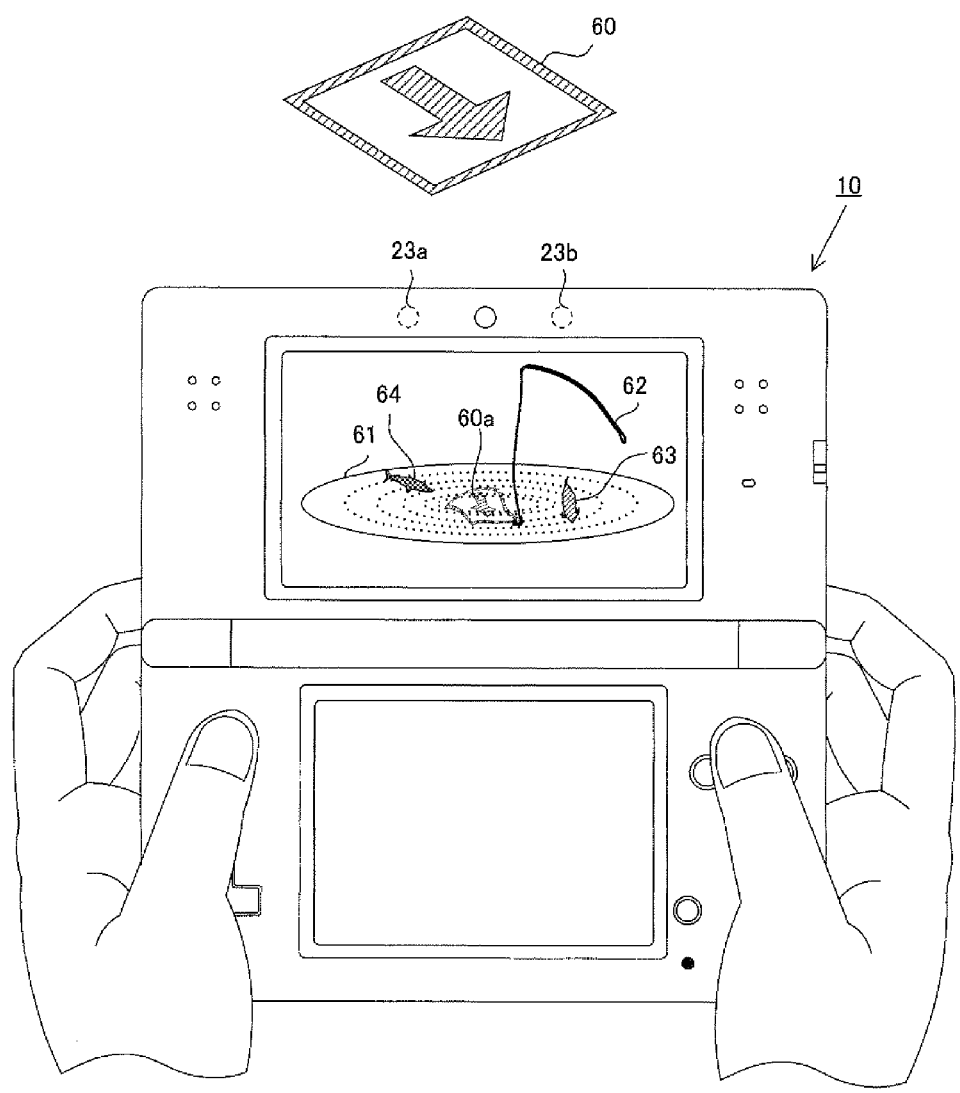
FIG. 7A is a diagram illustrating an example of an image displayed on a screen of an upper LCD 22 when an image of a marker 60 is taken by an outer imaging section 23.

FIG. 7A is a diagram illustrating an example of an image displayed on the upper LCD 22 when an image of a visual marker (hereinafter, referred to as marker) 60 is taken by the outer imaging section 23. The marker 60 has, on its surface, a square pattern including an arrow like pattern. The information processing section 31 can determine whether or not an image (real world image) obtained from the outer imaging section 23 includes the marker, by performing image processing (e.g., pattern matching) on the real world image. In addition, on the basis of the position and the orientation of the recognized marker 60, a marker coordinate system (a coordinate system having an origin at a predetermined point in a virtual space corresponding to the position of the marker 60 in the real world) is defined.

Next, on the basis of the position and the orientation of the marker 60 and information calculated from the position and the like, the information processing section 31 displays a plurality of virtual objects (e.g., a fishing rod object 62) on the upper LCD 22 such that the virtual objects are stereoscopically visible. Here, in order to appropriately combine the real world image and an image of a virtual world (a virtual world image), which is generated during the game processing, to extend/enhance perception information received from the real environment, a real space corresponding to the real world image including the marker 60 and a virtual space corresponding to the virtual world image need to be appropriately superimposed on each other.

Initially, the information processing section 31 causes a reference point in the real space to correspond to a reference point in the virtual space on the basis of the position of the marker 60 located in the real space. Next, the information processing section 31 sets a virtual camera in the virtual space such that the virtual camera has the same position and orientation as those of the outer imaging section 23 that takes an image of the real space. Then, the information processing section 31 causes the properties (e.g., parameters such as lens distortion, focal length, and an angle of view) of the virtual camera to agree with those of the outer imaging section 23 as necessary. In this manner, the real space corresponding to the real world image including the marker 60 and the virtual space corresponding to the virtual world image are appropriately superimposed on each other.

As one of the virtual objects located in the virtual space, a virtual object 61 that has a certain surface area and that represents a water surface (hereinafter, referred to as water surface object 61) is located substantially in parallel to and on a plane that includes the marker 60 (a plane π1 in FIG. 7C). The water surface object 61 is a model representing an interface between the atmosphere and a large amount of water (e.g., a pond or sea), and serves as a virtual surface defined in the virtual space. FIG. 7A illustrates a resultant displayed combination of the marker 60 (60a in the combination) included in the real world image and the virtual objects.

In the exemplified embodiment, the model for representing the water surface object 61 is not a complete plane but a three-dimensional model having a wavy curved surface for representing a surface wave (a mechanical wave traveling along the interface between different media). The curved surface may deform at predetermined time intervals in accordance with a progress of a game.

The surface of the model that defines the water surface object 61 serves as a virtual surface in the virtual space, and the virtual surface can separate the virtual space into some subspaces. For example, in the present embodiment, the surface of the three-dimensional model for the water surface object 61 or a main surface of the water surface object 61 (a plane obtained by performing average approximation of recesses and projections of the model; e.g., the above plane π1) can be defined as a virtual surface that separates the virtual space into a space "on the water" and a space "in the water". Here, when the main surface is assumed to be extended to infinity, the virtual space is separated into two spaces by the main surface. Of the two virtual spaces obtained by the separation, a space where the virtual camera is present can be defined as the space "on the water", and the other space can be defined as the space "in the water". The main surface of the water surface object 61 is actually defined as a region having a certain surface area, and thus the game processing is performed on the assumption of a limitation by the region.

It should be noted that a mode in which the virtual surface shown here is defined is intended to be illustrative, and the virtual surface in the present invention should not be limited to this example. In addition, the water surface object 61 may not be necessarily located in parallel to or on the plane including the marker 60, and it suffices that the water surface object 61 is located at such a position that a representation that is appropriate for a progress of the game can be ensured.

A virtual object 62, which represents a fishing rod having a fishing hook and a fishing line (hereinafter, referred to as fishing rod object 62), is located in the space "on the water" so as to be closer to the virtual camera than the water surface object 61. The fishing rod object 62 serves as a player object that is controllable by a user (player). The user moves the holding game apparatus 10 relative to the marker 60, the position of the virtual camera is updated in accordance with the movement, and the displayed positions of the virtual objects are also updated. The fishing rod object 62 is updated so as to be located in front of the virtual camera in the virtual space. Thus, the user can receive a feeling as if the holding game apparatus 10 is connected to the fishing rod object 62 in the virtual space. The fishing rod object 62 includes a portion 62a representing a fishing rod body (hereinafter, referred to as fishing rod body 62a), a portion 62b corresponding to the fishing line (hereinafter, referred to as fishing line portion 62b), and a portion 62c corresponding to the fishing hook (hereinafter, referred to as fishing hook portion 62c) (see FIG. 7E).

By the user performing an operation including movement of the game apparatus 10 relative to the marker 60, the fishing hook portion 62c of the fishing rod object 62 can be cast into a region under the water surface object 61 (that is, the space "in the water"). By so doing, the game provided by the game apparatus 10 progresses.

In the fishing game, the user casts the fishing hook portion 62c, aiming at fish indications projected on the water surface object 61 (indicated by reference characters 63 and 64 in FIG. 7A). The fish indications are a part of a representation image for suggesting that objects representing fish (hereinafter, referred to as fish objects) are present in the space "in the water" (one subspace in the virtual space). Meanwhile, the fishing rod object 62, which is controllable by the user, is located in the space "on the water" (a subspace, in the virtual space, which is different from the space "in the water").

In other words, during the progress of the game, the user controls the fishing rod object 62 by performing an operation of moving the game apparatus 10 relative to the marker 60, thereby establishing a certain correlation of the fishing rod object 62 with the fish objects located in the subspace different from the space in which the fishing rod object 62 is located.

When a certain pulling-up condition is satisfied while the game progresses, the user can pull a fish object corresponding to the fish indication, out of the water. Although the series of game processing will be described in more detail below ("processing according to a first embodiment"), a feeling felt by an angler during actual fishing can be more realistically reproduced by the present embodiment.

In other words, a feeling can be provided to the user as if the fishing rod object 62 is actually connected to the game apparatus 10 held by the user for operations and the fishing line portion 62b is dropped from the fishing rod object 62 into the water surface object 61 that is spatially integrated with the real world. Thus, an immersed feeling and a reality feeling of the user can be enhanced.

Next, a similar embodiment according to the present invention will be described.

Figure 7B:
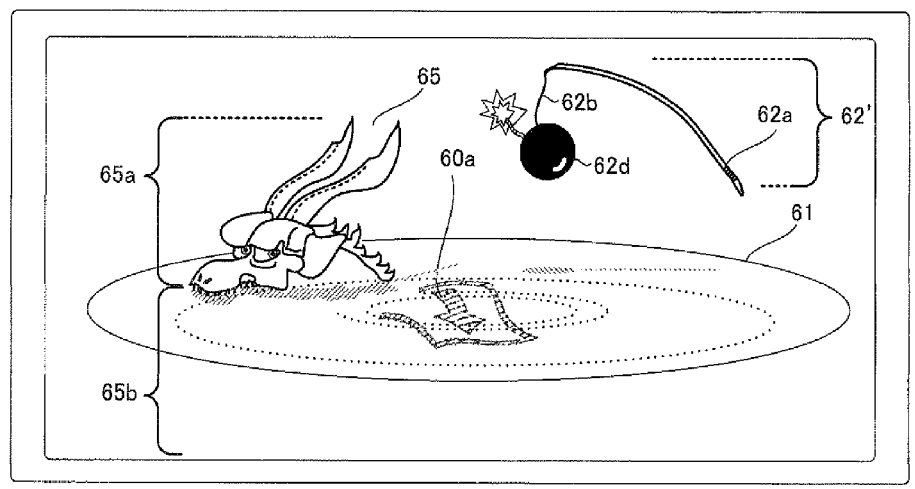
FIG. 7B is a diagram illustrating another example of the image displayed on the screen of the upper LCD 22 when an image of the marker 60 is taken by the outer imaging section 23.
Figure 7C:
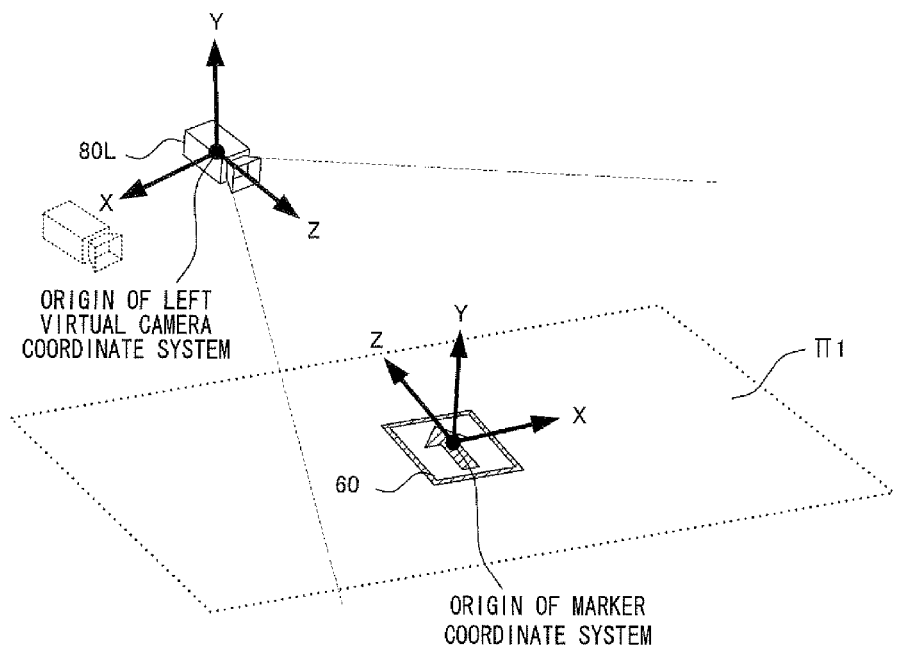
FIG. 7C is a diagram schematically illustrating an example of a relative position of a virtual camera and the marker 60.

FIG. 7B is a diagram illustrating another example of the image displayed on the screen of the upper LCD 22 when an image of the marker 60 is taken by the outer imaging section 23. FIG. 7B illustrates only the screen of the upper LCD 22. Similarly to FIG. 7A, FIG. 7B is a diagram illustrating an example of an image displayed in which virtual objects such as the water surface object 61 are superimposed on the real world image including the marker 60. The virtual objects located here are different from the virtual objects in FIG. 7A.

In this exemplified embodiment, a player object that is controllable by the user is a fishing rod object 62'. The fishing rod object 62' has a bomb portion 62d instead of the fishing hook portion 62c in the fishing rod object 62 shown in FIG. 7A. Meanwhile, an object 65 that moves while changing its position relative to the water surface object 61 defining the virtual surface (corresponding to the water surface) and that represents a dragon (hereinafter, referred to as dragon object 65), is provided as a non-player object.

The dragon object 65 has a portion 65a that projects upward from the upper surface of the water surface object 61 corresponding to the water surface (a portion located in the space "on the water") and a portion 65b (not shown in the drawing) that is located under the upper surface (a portion located in the space "in the water"). Along with the progress of the game, the information processing section 31 changes a ratio of the portion 65a and the portion 65b of the dragon object 65. In other words, the dragon object 65 is controlled such that the dragon object 65 moves along the water surface displayed on the upper LCD 22 and also along the y axis of the marker coordinate system.

When the dragon object 65 is in a state of having the portion 65a projecting upward from the upper surface of the water surface object 61 corresponding to the water surface, the user can attack the dragon object 65. In other words, unless coming out into the space "on the water" through the virtual surface, the dragon object 65 does not become a virtual object that can be attacked by the user.

Specifically, when the dragon object 65 has a portion exposed on the water surface, the user drops the bomb portion 62d at an end of the fishing rod object 62' by separating the bomb portion 62d therefrom (may drop the bomb portion 62d by extending the fishing line portion 62b instead of separating the bomb portion 62d). Then, the information processing section 31 determines whether or not the dropped bomb portion 62d has collided with the portion 65a of the dragon object 65 (it suffices to use an evaluation by a general determination of collision between three-dimensional objects). As a result, when the number of times of collision or the like satisfies a defined condition, the information processing section 31 displays, on the upper LCD 22, a presentation that the dragon object 65 disappears.

By the user moving the game apparatus 10, the position and the orientation of the marker 60 displayed on the screen of the upper LCD 22 change, and the positions and the orientations of the displayed virtual objects also change.

The series of game processing according to this embodiment will be described in more detail below ("processing according to a second embodiment").

Hereinafter, the game processing performed in the game apparatus 10 on the basis of the game program will be described in more detail with reference to FIGS. 7A to 13.

(Memory Map)

Figure 8:
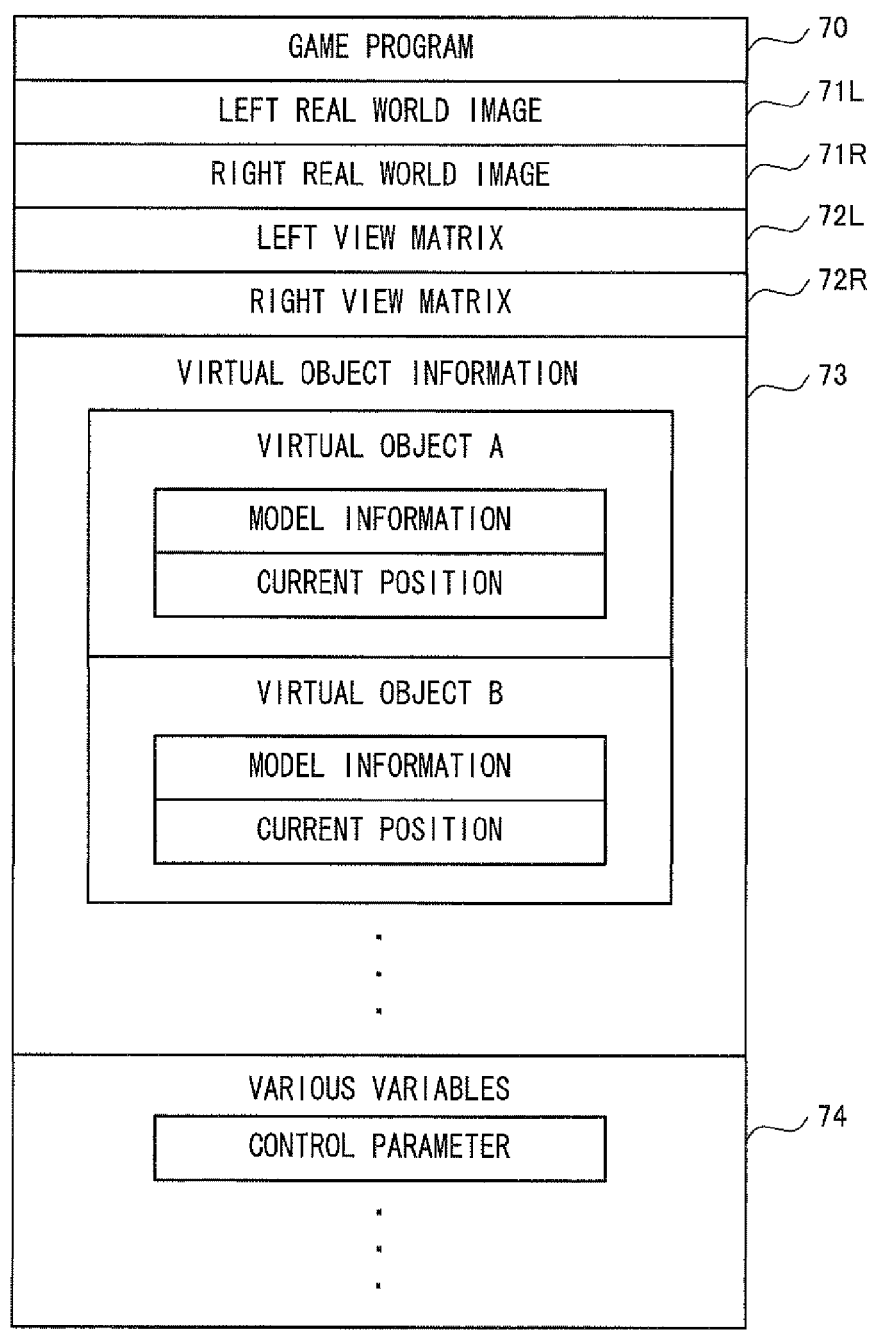
FIG. 8 is a diagram illustrating a memory map of a main memory 32 of the game apparatus 10.

Initially, main data that is stored in the main memory 32 during execution of the game program will be described. FIG. 8 is a diagram illustrating the memory map of the main memory 32 of the game apparatus 10. As shown in FIG. 8, the game program 70, a left real world image 71L, a right real world image 71R, a left view matrix 72L, a right view matrix 72R, virtual object information 73, various variables 74, and the like are stored in the main memory 32.

The game program 70 is a program for causing the information processing section 31 to performs the game processing.

The left real world image 71L is an image taken by the outer imaging section (left) 23a.

The right real world image 71R is an image taken by the outer imaging section (right) 23b.

The left view matrix 72L is used when rendering a virtual object that is viewed from a left virtual camera 80L, and is a coordinate transformation matrix for transforming a coordinate represented in the marker coordinate system into a coordinate represented in a left virtual camera coordinate system.

The right view matrix 72R is used when rendering a virtual object that is viewed from a right virtual camera 80R, and is a coordinate transformation matrix for transforming a coordinate represented in the marker coordinate system into a coordinate represented in a right virtual camera coordinate system.

The virtual object information 73 is information on virtual objects and includes model information representing the shapes and patterns of the virtual objects, current positions of the virtual objects in the virtual space, and the like.

The various variables 74 are used when the game program 70 is executed.

When the game apparatus 10 is powered on, the information processing section 31 (the CPU 311) of the game apparatus 10 executes a boot program stored in a ROM (not shown), thereby initializing each unit such as the main memory 32. Next, the game program stored in the internal data storage memory 35 is loaded into the main memory 32, and execution of the game program is started by the CPU 311 of the information processing section 31.

Figure 9A:
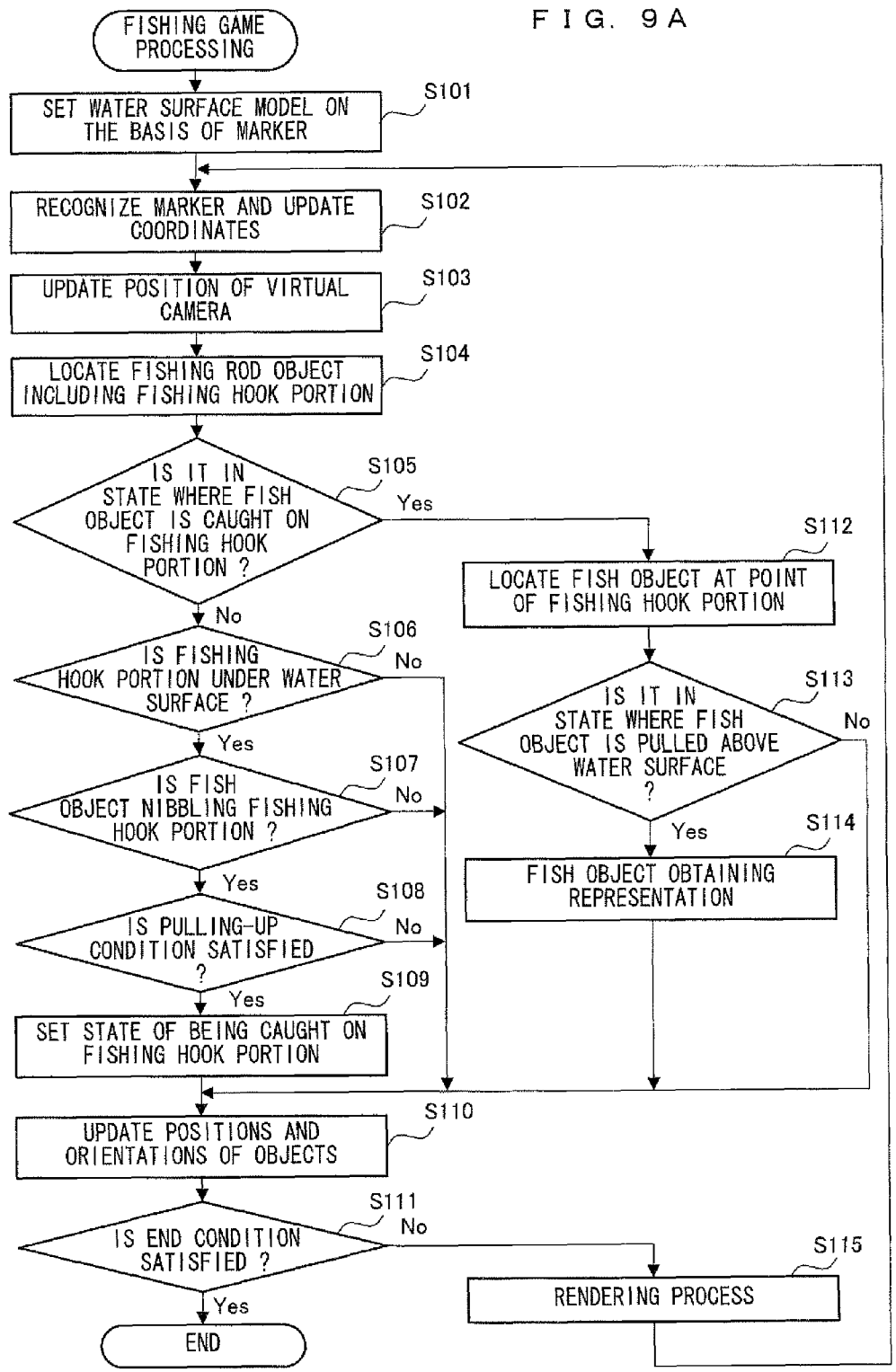
FIG. 9A is a flowchart illustrating an example of a flow of game processing performed by a CPU 311 on the basis of a game program 70.
Figure 9B:
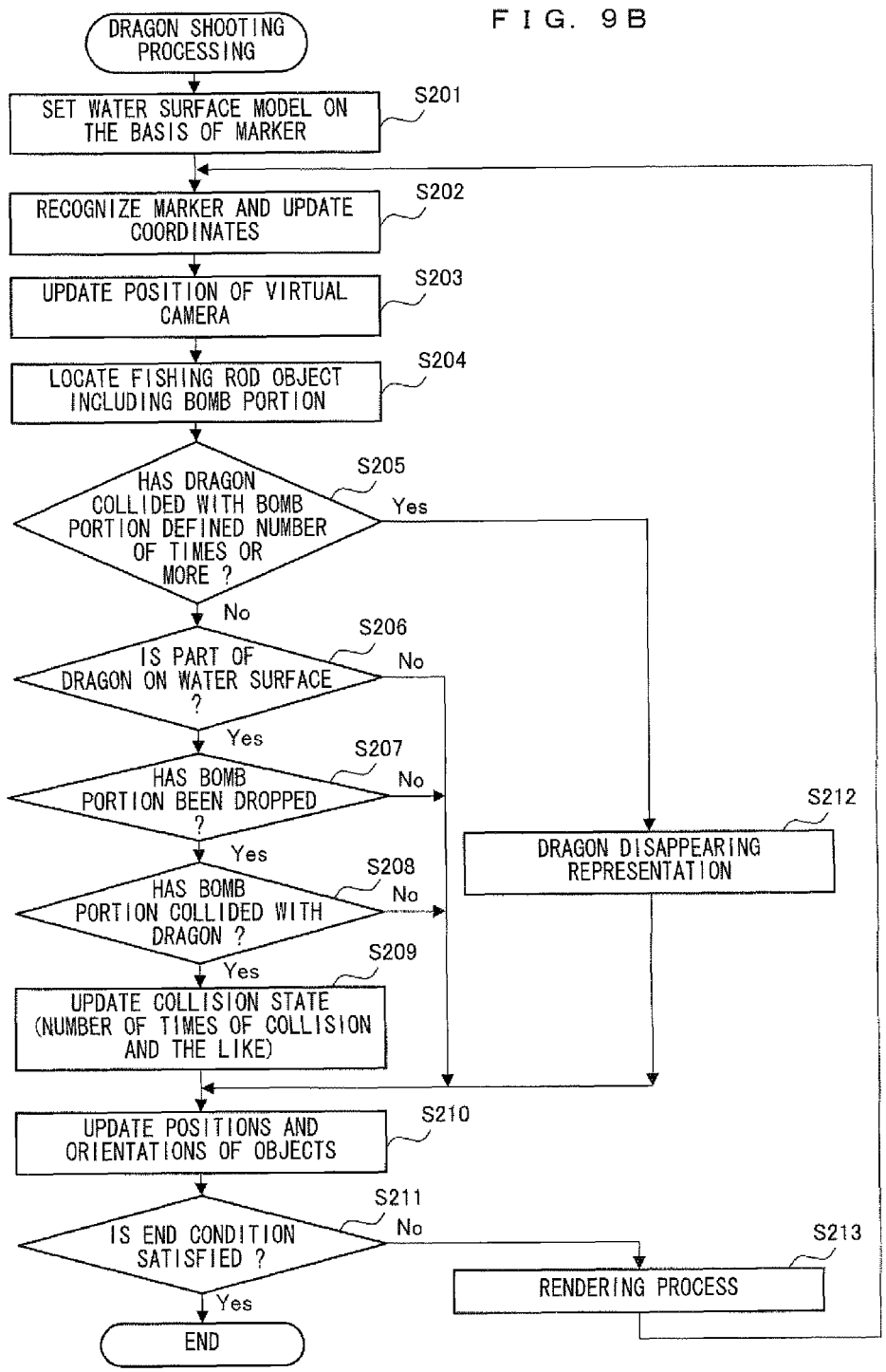
FIG. 9B is a flowchart illustrating another example of the flow of the game processing performed by the CPU 311 on the basis of the game program 70.

Hereinafter, flows of the processing performed on the basis of the game program will be described with reference to flowcharts in FIGS. 9A and 9B. In FIGS. 9A and 9B, "step" is abbreviated as "S". It should be noted that the flowcharts in FIGS. 9A and 9B are merely examples. Therefore, the order of each process step may be changed as long as the same result is obtained. In addition, the values of the variables and thresholds used at determination steps are also merely examples, and other values may be used as necessary. Moreover, in the present embodiment, the CPU 311 performs processes at all steps in the flowcharts in FIGS. 9A and 9B. However, a processor or a dedicated circuit other than the CPU 311 may perform processes at some of the steps in the flowcharts in FIGS. 9A and 9B.

(Processing According to First Embodiment: Fishing Game)

FIG. 9A is a flowchart illustrating a flow of the game processing performed by the CPU 311 on the basis of the game program 70. Specifically, FIG. 9A illustrates exemplified processing according to a game that incorporates elements of fishing in the real world into the progress of the game. Hereinafter, details of the game processing will be described.

At step 101 in FIG. 9A, the CPU 311 sets the water surface object 61 on the basis of information of the position and the like of the marker 60 that is recognized on the basis of an image taken by the outer imaging section 23 of the game apparatus 10.

In the present embodiment, the CPU 311 causes coordinates in the virtual space to correspond to absolute coordinates in the real space (e.g., coordinates in the marker coordinate system) on the basis of the marker 60. The CPU 311 sets a predetermined position in the marker 60 recognized by pattern matching or the like, as the origin of the marker coordinate system (FIG. 7C). FIG. 7C is a diagram schematically illustrating a relative position of the virtual camera (the left virtual camera 80L is indicated by a solid line and the right virtual camera 80R is indicated by a dotted line in this drawing) and the marker 60. The process of recognizing the marker, which is performed here, is the same in principle as a part of a process concerning marker recognition and update at subsequent step 102.

Next, the CPU 311 sets the virtual camera such that the virtual camera has the same position and orientation with respect to the marker 60, which is a reference point, as those of the outer imaging section 23 that takes an image of the real space. Then, the CPU 311 causes the properties (e.g., parameters such as lens distortion, focal length, and an angle of view) of the virtual camera to agree with those of the outer imaging section 23 as necessary. In this manner, the real space corresponding to the real world image including the marker 60 and the virtual space corresponding to the virtual world image are appropriately superimposed on each other. The setting of the virtual camera, which is performed here, is the same in principle as a part of a process of updating the position of the virtual camera at subsequent step 103.

Figure 7D:
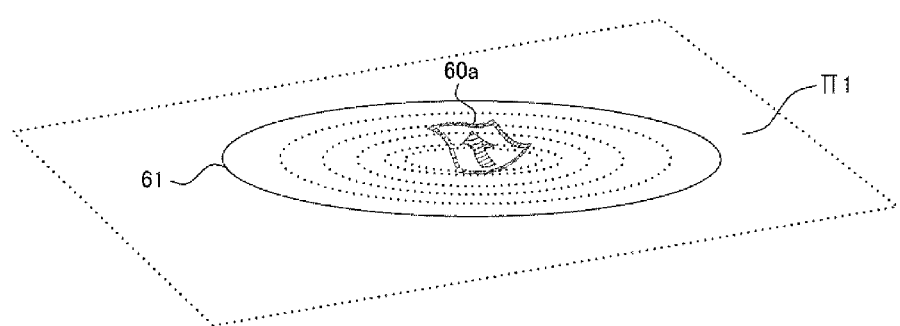
FIG. 7D is a diagram illustrating an example of a water surface object 61 located in a virtual space.

Next, the CPU 311 locates the water surface object 61 in the virtual space such that the water surface object 61 is parallel to the plane π1 including the marker 60 (see FIG. 7D). FIG. 7D illustrates an example of the water surface object 61 located in the virtual space. Here, the CPU 311 performs mapping of an image taken by the outer imaging section 23 to the surface of the three-dimensional model (e.g., a model of a polygon) indicating the water surface object 61. In addition, the CPU 311 performs mapping of a taken image of the real world including the marker 60 to a representation of the three-dimensional model for the water surface object 61.

As described above, after the virtual camera in the virtual space is set at a position corresponding to the outer imaging section 23 (real camera) with respect to the marker 60, the CPU 311 performs mapping of the above taken image to the three-dimensional model (polygon) indicating the water surface object 61. Thus, it is possible to generate a superimposed image that is viewed by the user as if the water surface appears in the real world. Incidentally, by the mapping being performed, the taken image follows the shape of the three-dimensional model for the water surface object 61 and is viewed such that a part thereof is deformed (e.g., the marker 60 becomes a form indicated by 60a in FIG. 7D).

At step 102, the CPU 311 performs a recognition process of the marker 60 on the basis of the image obtained by the outer imaging section 23, and updates the coordinates in the marker coordinate system.

At step 103, the CPU 311 updates the position and the orientation of the virtual camera on the basis of the updated coordinates calculated at step 102. Although described below, the update of the position and the orientation of the virtual camera is performed by the CPU 311 calculating a view matrix (a matrix in which the position and the orientation of the virtual camera that are calculated on the basis of the position and the orientation of the marker in the real world image are reflected). In addition, similarly to step 101, the CPU 311 can cause the properties (e.g., parameters such as lens distortion, focal length, and an angle of view) of the virtual camera to agree with those of the outer imaging section 23 as necessary.

Hereinafter, details of the series of processes at steps 101 to 103 will be described. First, the marker recognition process performed at steps 101 and 102 will be described. It should be noted that the marker recognition process described here is described on the assumption that the game apparatus 10 provides a stereoscopically visible image to the user. When stereoscopic viewing is not required, one skilled in the art can specifically understand a marker recognition process performed in the case where stereoscopic viewing is not performed, from the following description.

Figure 10:
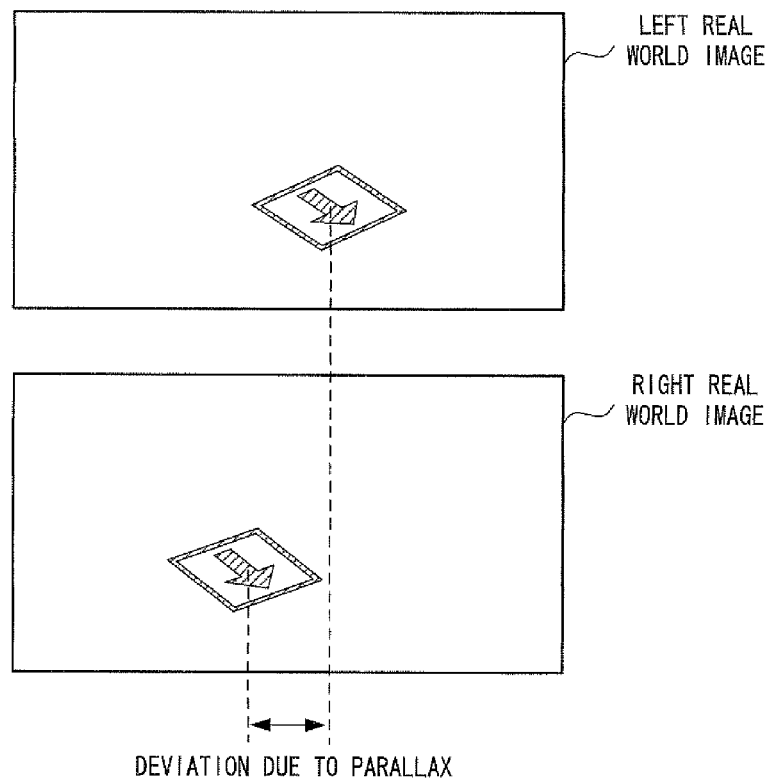
FIG. 10 is a diagram illustrating an example of a left real world image and a right real world image.

As described above, in the upper housing 21, there is a certain interval (e.g., 3.5 cm) between the outer imaging section (left) 23a and the outer imaging section (right) 23b. Thus, when images of the marker 60 are simultaneously taken by the outer imaging section (left) 23a and the outer imaging section (right) 23b, the position and the orientation of the marker 60 in a left real world image taken by the outer imaging section (left) 23a are different from the position and the orientation of the marker 60 in a right real world image taken by the outer imaging section (right) 23b, as shown in FIG. 10, due to the parallax. The CPU 311 performs the marker recognition process on at least either one of the left real world image or the right real world image.

For example, when performing the marker recognition process on the left real world image, the CPU 311 determines whether or not the marker 60 is included in the left real world image, by using pattern matching or the like. When the marker 60 is included in the left real world image, the CPU 311 calculates a left view matrix 72L on the basis of the position and the orientation of the marker 60 in the left real world image. The left view matrix 72L is a matrix in which a position and an orientation of the left virtual camera that are calculated on the basis of the position and the orientation of the marker 60 in the left real world image are reflected.

Figure 11:
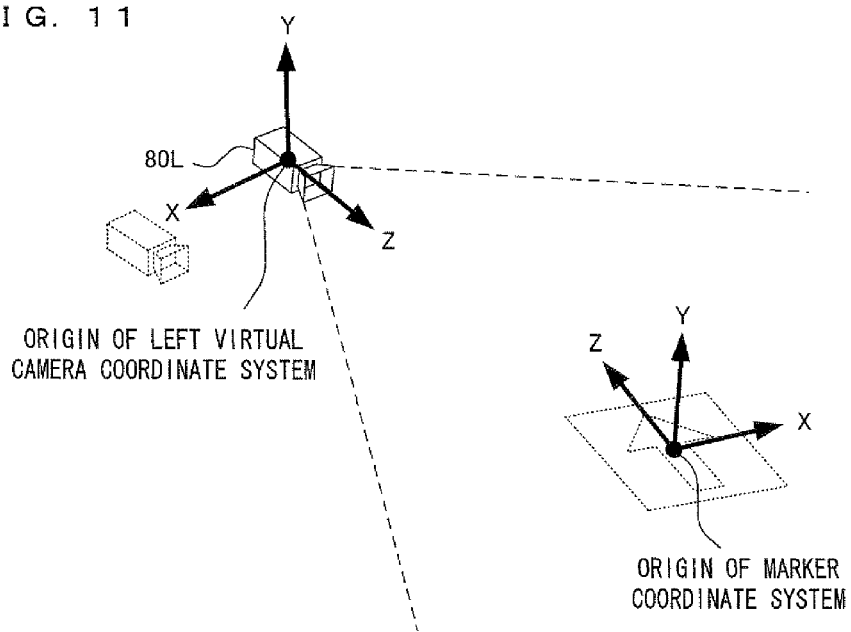
FIG. 11 is a diagram illustrating a position and an orientation of a left virtual camera 80L that are calculated in accordance with a result of a marker recognition process.

More precisely, as shown in FIG. 11, the left view matrix 72L is a coordinate transformation matrix for transforming a coordinate represented in the marker coordinate system in the virtual space (a coordinate system having an origin at a predetermined point in the virtual space corresponding to the position of the marker 60 in the real world) into a coordinate represented in a left virtual camera coordinate system based on the position and the orientation of the left virtual camera 80L (the virtual camera in the virtual space corresponding to the outer imaging section (left) 23a in the real world) that are calculated on the basis of the position and the orientation of the marker 60 in the left real world image.

Further, when performing the marker recognition process on the right real world image, the CPU 311 determines whether or not the marker 60 is included in the right real world image, by using pattern matching or the like. When the marker 60 is included in the right real world image, the CPU 311 calculates a right view matrix 72R on the basis of the position and the orientation of the marker 60 in the right real world image. The right view matrix 72R is a matrix in which a position and an orientation of the right virtual camera that are calculated on the basis of the position and the orientation of the marker 60 in the right real world image are reflected.

Figure 12:
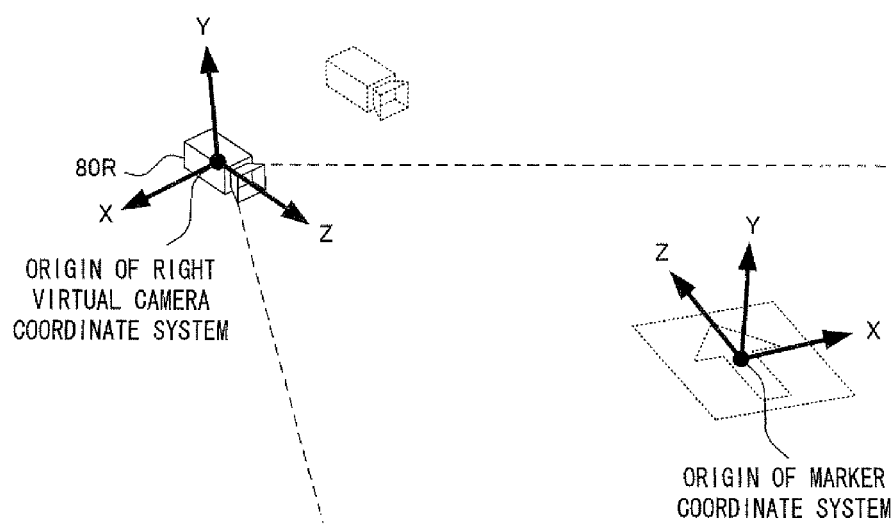
FIG. 12 is a diagram illustrating a position and an orientation of a right virtual camera 80R that are calculated in accordance with a result of the marker recognition process.

More precisely, as shown in FIG. 12, the right view matrix 72R is a coordinate transformation matrix for transforming a coordinate represented in the marker coordinate system in the virtual space (the coordinate system having the origin at the predetermined point in the virtual space corresponding to the position of the marker 60 in the real world) into a coordinate represented in a right virtual camera coordinate system based on the position and the orientation of the right virtual camera 80R (the virtual camera in the virtual space corresponding to the outer imaging section (right) 23b in the real world) that are calculated on the basis of the position and the orientation of the marker 60 in the right real world image.

When it is assumed that there are no errors in accuracy of the marker recognition and there are no errors in accuracy of mounting the outer imaging section (left) 23a and the outer imaging section (right) 23b to the game apparatus 10, the position of the right virtual camera 80R that is calculated from the marker recognition result of the right real world image is a position that is shifted from the position of the left virtual camera 80L that is calculated from the marker recognition result of the left real world image, along the x axis direction of the left virtual camera coordinate system by a certain distance. In addition, the orientation of the right virtual camera 80R that is calculated from the marker recognition result of the right real world image is the same as the orientation of the left virtual camera 80L that is calculated from the marker recognition result of the left real world image (that is, the x axis, the y axis, the z axis of the left virtual camera coordinate system are parallel to the x axis, the y axis, the z axis of the right virtual camera coordinate system, respectively).

Figure 13:
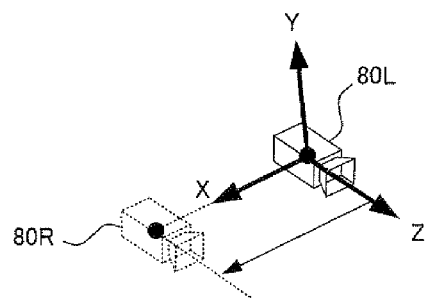
FIG. 13 is a diagram illustrating a position of the right virtual camera 80R that is set on the basis of a position and an orientation of the left virtual camera 80L.

However, since there are in reality some errors in accuracy of the marker recognition and accuracy of mounting the outer imaging section (left) 23a and the outer imaging section (right) 23b to the game apparatus 10, the position and the orientation that are calculated from the marker recognition result of the right real world image and the position and the orientation of the right virtual camera 80R that are calculated from the marker recognition result of the left real world image do not have an ideal relation (e.g., the left virtual camera 80L and the right virtual camera 80R are too close to each other or too distance from each other, and the orientation of the left virtual camera 80L and the orientation of the right virtual camera 80R are different from each other). Thus, when virtual objects are stereoscopically displayed on the upper LCD 22 by using the thus-calculated positions and orientations of the left virtual camera 80L and the right virtual camera 80R, the virtual objects may not be successfully stereoscopically viewed. Therefore, in the present embodiment, as an example, as shown in FIG. 13, the position and the orientation of the right virtual camera 80R are set on the basis of the position and the orientation of the left virtual camera 80L that are calculated from the marker recognition result of the left real world image.

At step 104, the CPU 311 locates the fishing rod object 62 at a predetermined position in the virtual space. The fishing rod object 62 includes the fishing rod body 62a, the fishing line portion 62b, and the fishing hook portion 62c. The fishing rod body 62a of the fishing rod object 62 is located, for example, on the near side of the water surface object 61 when viewed from the user operating the game apparatus 10, as shown in FIG. 7A. By the CPU 311 locating the fishing rod object 62 on the upper LCD 22 and at a position closer to the virtual camera (that is, the viewpoint of the user) than the water surface object 61, a feeling can be provided to the user as if the user holds a fishing rod and casts a fishing hook into the water spreading in front of the user, for example. The fishing rod object 62 is controllable by the user in the game processing. By operating the game apparatus 10, the user can extend the fishing line in the virtual space, cast the fishing hook portion 62c into a region indicated by the water surface object 61, and locate the fishing hook portion 62c in the virtual space in the water. Thus, at this step, the CPU 311 updates the position of the fishing hook portion 62c to a position corresponding to an operation performed by the user on the game apparatus 10.

At step 105, the CPU 311 determines whether or not it is in a state where a fish object is caught on the cast-in fishing hook portion 62c of the fishing rod object 62 (a "state where a fish (object) is caught on the fishing hook portion"). The "state where the fish object is caught on the fishing hook portion" is a state where the fish holds a fishing hook in its mouth during fishing performed in the real environment, and is an internal state that represents a state before the fish is pulled out of the water (pulled up) and that is defined for the game processing. In an initial state or when no fish object is caught on the fishing hook portion 62c in the progress of the game processing (No at step 105), the CPU 311 performs a process at subsequent step 106. On the other hand, when the determination at step 105 is performed after the CPU 311 performs setting of a "state of being caught on the fishing hook portion" at subsequent step 109 (Yes at step 105), the CPU 311 subsequently performs a process at step 112.

At step 106, the CPU 311 determines whether or not the fishing hook portion 62c of the fishing rod object 62 is located under the water surface object 61 that is defined on the basis of the position information of the marker 60 and the like. The CPU 311 performs the determination by obtaining the coordinate of each located virtual object (e.g., the y coordinate of each object) in a predetermined coordinate system (e.g., the marker coordinate system) and comparing these coordinates. When it is determined that the fishing hook portion 62c is located under the water surface (that is, the virtual surface defined on the basis of the water surface object 61) (that is, in the space "in the water"), the CPU 311 proceeds to a process at step 107.

At step 107, the CPU 311 determines whether or not it is in a state where a fish object (a virtual object corresponding to a fish indication 63 or 64) is nibbling the fishing hook portion 62c. Here, the state where "the fish object is nibbling the fishing hook portion" is a state where it is possible to shift to a determination process of a fish pulling-up (landing) condition in a subsequent process, and is an internal state where an action of a targeted fish trying to bite a fishing hook during actual fishing is represented in the game processing.

Specifically, when the distance between the fishing hook portion 62c that has been cast under the water surface and the fish object that is a pulled-up candidate falls within a predetermined range, the CPU 311 determines that it is in the state where it is possible to perform the determination of the pulling-up condition (that is, the state where the fish object is nibbling the fishing hook portion) (Yes at step 107). While the distance between the fishing hook portion 62c and the fish object that is the pulled-up candidate falls within the predetermined range, the CPU 311 displays an image corresponding to a scene in which the fish indication corresponding to the fish object is nibbling, at regular time intervals, the fishing hook portion 62c displayed on the upper LCD 22 (through a rendering process at step 115).

It should be noted that the CPU 311 can set a condition for cancelling the state where "the fish object is nibbling the fishing hook portion", during this processing. In other words, even when the distance between the fishing hook portion 62c and the fish object falls within the predetermined range at a certain time point, if the "pulling-up condition" described below is not satisfied before a predetermined time period elapses, the CPU 311 can compulsorily cancel the internal state in the game processing as the "state where the fish object is nibbling the fishing hook portion". When the compulsory cancellation is completed, it is not determined at step 107 that it is in the "state where the fish object is nibbling the fishing hook portion" (No at step 107), and a representation in which the fish is going away is performed to the user in the rendering process at subsequent step 115. Thus, even when the state where "the fish object is nibbling the fishing hook portion" is established in the game processing, if the pulling-up condition cannot be satisfied within the predetermined time period, the user cannot pull the fish out of the water.

In the determination of the state where "the fish object is nibbling the fishing hook portion", the CPU 311 calculates the distance between the fishing hook portion 62c and the fish object that is the pulled-up candidate. Here, an exemplified method of calculating such a distance will be described, but in this connection, first, a method of displaying fish indications on the water surface object 61 will be described.

As described above, the CPU 311 displays the fish indications 63 and 64 on the water surface object 61 as shown in FIG. 7A. The shape of the water surface object 61 in the virtual space is defined by the three-dimensional model (polygon). In the present embodiment, the CPU 311 generates a superimposed image in which a water surface looks to appear in the real world, by performing mapping of an image taken by the outer imaging section 23 to the polygon. Here, the CPU 311 can represent the fish indications 63 and 64 by blending textures for indicating these fish indications and the image of the real world of which the above mapping is performed, and displaying the resultant image on the polygon.

When the fishing hook portion 62c that has been cast in the virtual space by the user performing an operation of moving the game apparatus 10 is located in the y axis negative direction in the marker coordinate system with respect to the water surface object 61 (that is, in the case of Yes at step 106), the CPU 311 calculates the distance between the fishing hook portion 62c and each fish object generated randomly by the CPU 311, or a distance regarded as being equivalent to this distance.

When the CPU 311 performs the distance calculation, it suffices that the CPU 311 obtains the position of the fishing hook portion 62c and the position at which each fish object is located, and at this stage, it is not necessarily necessary to assign a model indicating a three-dimensional shape of each fish object located there.

Figure 7E:
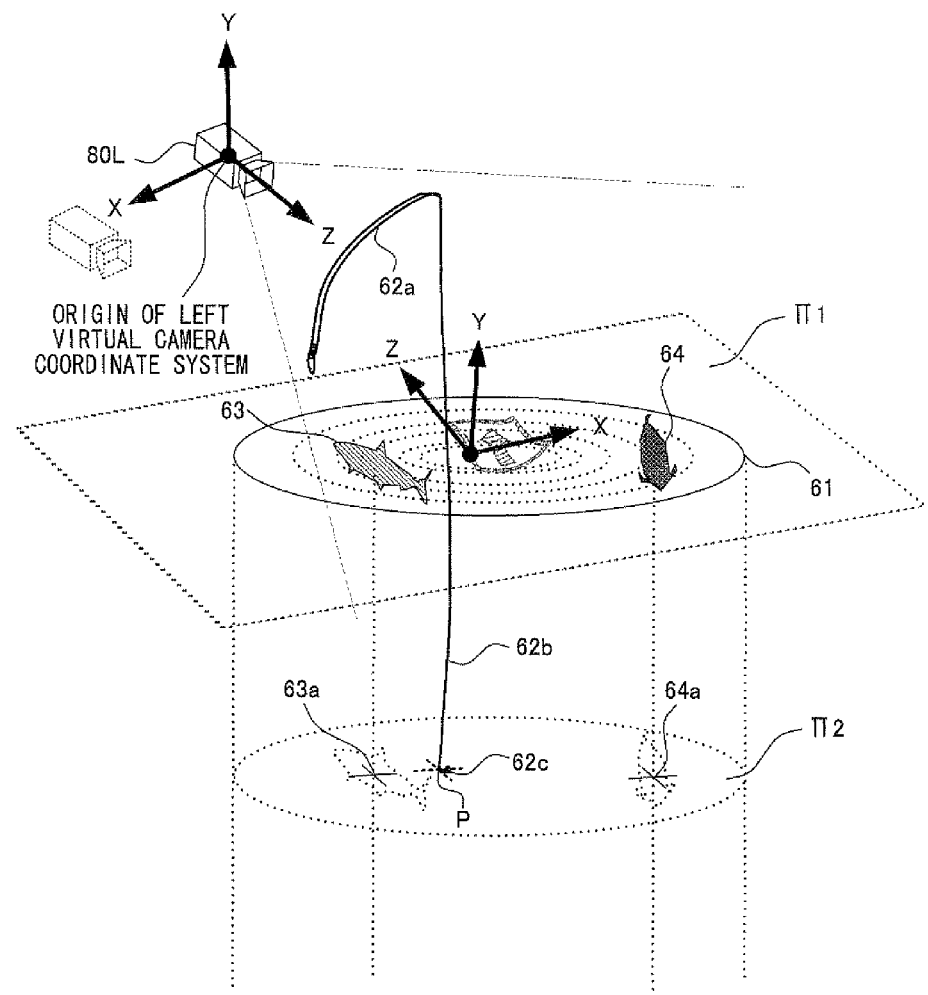
FIG. 7E is a diagram illustrating exemplified positional relations among virtual objects and the like in the virtual space.

Specifically, in the present embodiment, until performing the process at subsequent step 112, the CPU 311 provides a representative point indicating a position in the virtual space to each fish object that is a target, and does not perform a rendering process using a three-dimensional model corresponding to each fish object. Here, FIG. 7E is referred to. FIG.

7E is a diagram schematically illustrating positional relations among the virtual objects and the virtual camera in the virtual space shown in FIG. 7A. In the example shown in FIG. 7E, the CPU 311 can randomly assign any point as a position of each fish object onto a plane π2 (a plane that is parallel to the virtual surface π1 and that includes a point P of the fishing hook portion 62*c* in the virtual space). In this example, the CPU 311 assigns points 63*a* and 64*a* as the positions at which the fish objects are to be located. As a method of assigning the position, for example, the assignment can be performed by using a set of random numbers having a predetermined distribution.

The CPU 311 represents fish indications by blending (e.g., alpha blending) a predetermined texture (e.g., a texture having a single pure color (e.g., black) or a texture in which certain shades of color are assigned in accordance with the distance between the plane π1 and the plane π2) with the taken image, which is mapped to the surface of the water surface object 61, so as to correspond to the points 63*a* and 64*a*. By so doing, the CPU 311 can provide, to the user, a representation as if fish are present under the water surface defined by the water surface object 61.

In the case of the example shown in FIG. 7E, the determination as to whether or not it is in the state where "the fish object is nibbling the fishing hook portion" is performed by determining that it is in this state, when the distance between the coordinate of the point P of the fishing hook portion 62*c* on the plane π2 and the point 63*a* or 64*a* falls within a predetermined range. In this example, the method in which the plane π2 is assumed is used, but the CPU 311 may perform the process at step 107 without using the plane π2. In other words, the CPU 311 may randomly define the positions of fish indications directly on the surface of the water surface object 61 located in the virtual space (or approximately on the plane π1), and then may calculate the distance between the intersection of the fishing line portion 62*b* and the surface of the water surface object 61 (corresponding to the point P when the plane π2 is used) and a point indicating the position of each fish indication located on the water surface object 61.

Meanwhile, a situation may occur where in the progress of the game provided by the game apparatus 10, the user largely moves the game apparatus 10 and the marker 60 deviates from the imaging range of the outer imaging section 23. However, the CPU 311 can lead the position and the orientation of the outer imaging section 23 to a state convenient for performing the marker recognition process, by limiting the positions of the fish indications displayed on the upper LCD 22 to a certain region.

Figure 7F:
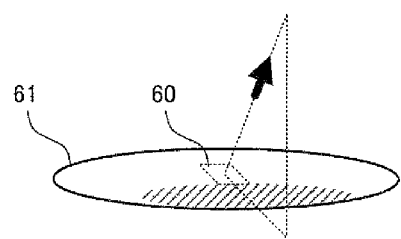
FIG. 7F is a diagram illustrating an example of a mode in which a region (a shaded portion in the drawing) where fish indications appear is limited.

Specifically, the CPU 311 can locate the fish objects such that their fish indications appear in a region between the marker 60 and the virtual camera in the virtual space or such that this tendency is increased. FIG. 7F is a schematic diagram illustrating an example of a mode in which a region (a shaded portion in the drawing) where fish indications appear is limited. The position indicated by a dotted line is the position of the marker 60. The direction indicated by an arrow in FIG. 7F is a direction to the virtual camera (the outer imaging section 23). When randomly locating the fish objects, it suffices that the CPU 311 controls this locating such that fish indications appear in the shaded region with high frequency.

Referring back to FIG. 9A, processes subsequent to step 107 will be described. When the state where "the fish object is nibbling the fishing hook portion" is established (Yes at step 107), the CPU 311 performs a process of determining whether or not it is possible to pull up the fish object (step 108).

At step 108, the CPU 311 can perform a determination of the following condition. The pulling-up condition is that (A) a moving amount of the fishing rod object 62 in the virtual space which amount is defined on the basis of the relative position of the outer imaging section 23 and the marker 60 (an amount in which an amount by which the game apparatus 10 is moved relative to the marker 60 is reflected) reaches a predetermined value, or (B) the marker 60 is not detected in the marker recognition of an image taken by the outer imaging section 23, even when the moving amount does not reach the predetermined value. When either condition is satisfied (Yes at step 108), the CPU 311 determines that it is in a state where the user pulls the fish out of the water, and proceeds to subsequent step 109. On the other hand, when the pulling-up condition is not satisfied (No at step 108), the CPU 311 performs a process of updating the positions and the orientations of the objects on the basis of an input operation performed by the user on the game apparatus 10 and the like (step 110).

The pulling-up condition (A) will be described in more detail. In accordance with the progress of the game (e.g., the state where the fish is nibbling the fishing hook), the user moves the holding game apparatus 10 (see FIG. 7A) such that its position changes relative to the marker 60 (e.g., by a motion as if pulling up). The CPU 311 can use an amount by which the fishing hook portion 62*c* moves in the virtual space for a predetermined time period (e.g., a one-frame time) in the game processing as a result of this operation of the user (e.g., a distance by which the fishing hook portion 62*c* moves in the y axis positive direction in the marker coordinate system), as a moving mount that is a determination target for the pulling-up condition.

In other words, the moving amount is obtained as a result of the operation performed by the user on the game apparatus 10. When the user moves the game apparatus 10 relative to the marker 60 by a predetermined action (an action of pulling up the game apparatus 10 for pulling the fish out of the water, with regarding the game apparatus 10 as a part of a fishing rod), the CPU 311 can assign a physical amount defining the action performed by the user in the real world, as a change amount in the virtual world (e.g., a translational moving distance of the virtual objects) on the basis of position information obtained through the marker recognition and coordinate update (step 102) and the update of the position of the virtual camera (step 103). For example, when the fishing hook portion 62*c* is located in the virtual world as shown in FIG. 7E and then it becomes a state where any fish object is caught on the fishing hook portion 62*c*, the CPU 311 can use the distance Δy) from the plane π2 to the fishing hook portion 62*c* when the fishing hook portion 62*c* moves in the y axis positive direction as a result of an operation of the user, as the moving mount that is the determination target for the pulling-up condition.

Meanwhile, the pulling-up condition (B) is the case where even when this moving amount does not reach the predetermined value, the marker 60 is not detected in the marker recognition of an image taken by the outer imaging section 23. This condition is a condition for avoiding the case where as a result of an action performed by the user holding the game apparatus 10, even if the moving amount exceeds the predetermined value, the recognition of the marker 60 fails since the action is large.

Next, at step 109, the CPU 311 sets the internal state in the progress of the game as the state where the fish is caught on the hook. When with this setting maintained, an end condition (see subsequent step 111) such as performing an input for ending the game is not satisfied and the game processing continues, the CPU 311 determines at step 105 that it is in the "state where the fish (object) is caught on the hook (portion)" (Yes at step 105), and proceeds to step 112.

At step 111, the CPU 311 determines whether or not the end condition is satisfied. The end condition can be set according to the situation of the game processing such that the end condition is satisfied when the user performs an action assigned to an input operation on the game apparatus 10. For example, this action is the user pressing a predetermined button (e.g., the start button 14L, or the power button 14F) in the game apparatus 10 and selecting end of the game processing in a menu display in which an end operation of the game processing can be selected. However, this action is not limited thereto.

At step 112, the CPU 311 locates the fish object at the tip of the hook. In the present embodiment, for example, a process of providing a specific three-dimensional model (polygon) to the fish object assumed at the position 63a in FIG. 7E is not performed in the processing prior to this step. At step 112, in order that the user feels presence of the fish similarly as an angler feels when pulling a fish out of the water, the CPU 311 locates a three-dimensional object at the tip of the fishing hook portion 62c when the fish object is pulled up. Then, the CPU 311 proceeds to next step 113.

At step 113, the CPU 311 determines whether or not it is in a state where the fish object is pulled above the water surface. At this step, the CPU 311 performs the same process as the moving amount calculation/evaluation process performed at step 108. For example, when the moving amount of the game apparatus 10 in the state immediately before this step (e.g., a moving amount along the y axis of the marker coordinate system) is equal to or higher than a predetermined value, the CPU 311 determines that "the fish object is pulled above the water surface" (Yes at step 113), and can perform a process at subsequent step 114. On the other hand, when determining at step 113 that "the fish object is not pulled above the water surface", the CPU 311 performs a process at subsequent step 110.

At step 114, the CPU 311 performs a representation indicating that the fish object is obtained. The CPU 311 performs a representation using the three-dimensional model located at step 112.

At step 115, the CPU 311 performs the rendering process. The CPU 311 displays a game image to the user in accordance with the internal state in the game processing and according to a procedure stored in a storage area of the game apparatus 10.

(One Example of Effect Provided by First Embodiment)

According to such a configuration of the present embodiment, a feeling can be provide to the user as if fish and a fishing rod are present in the real space, the fishing rod is connected to the game apparatus 10, and a line is dropped therefrom into a water surface. Thus, when the fishing game is played while the game apparatus 10 is operated, feelings such as an immersed feeling and a reality feeling can be enhanced as compared to those with a conventional game apparatus.

More specifically, in the game apparatus 10 of the present embodiment, with respect to the virtual surface (the water surface object 61) that is set on the basis of the visual marker (marker 60) for generating a superimposed image by combining a real world image and a virtual world image, the player object (the fishing rod object 62) is located in the virtual space on the virtual camera side (the space on the water), while the non-player objects (the fish objects) are located in the "space in the water" that is defined so as to be adjacent to the space on the water and separated by the virtual surface from the space on the water. In such a configuration, the user participates in the game by holding the game apparatus 10 while viewing the above superimposed image displayed on the display device (the upper LCD 22) integral to the game apparatus 10, and by performing an operation of moving the outer imaging section 23 taking an image of the marker 60, that is, the entire game apparatus 10, relative to the marker 60. Thus, feelings such as an immersed feeling and a reality feeling that are enhanced as compared to those with a conventional game apparatus can be provided to the user.

Further, in the game processing, the game apparatus 10 changes the positional relation of either of the player object or the non-player objects or both of them with respect to the virtual surface. Thus, feelings such as an immersed feeling and a reality feeling that are further enhanced can be provided to the user.

Further, as described above, the method of representing fish indications by blending a predetermined texture with a take image that is mapped to the water surface object 61 allows rendering a group of fish objects, assumed under the water surface, by using sequentially a three-dimensional model (polygon) to be avoided. Thus, a feeling that is obtained by an angler at a water's edge during fishing can be provided even while the load on the game processing is greatly reduced.

Meanwhile, in the conventional art, when fish indications for fish objects to which three-dimensional models located under a water surface are provided are represented by using transparent processing, in particular, when a superimposed image is generated with an image of the real world, it is difficult to achieve both more realistic rendering of a region having a large depth of water (e.g., a region corresponding to a sea or lake bottom and a region that incoming visible light does not reach) and seamlessly synthesizing virtual objects with a taken image of the real world. However, if the method used in the exemplified embodiment described above is used, it is easy to represent a water surface having a surface wave while rendering fish indications as necessary, even by using an opaque real world image that has not been subjected to transparent processing, without being restrained by the problems concerning rendering of a region having a large depth of water.

(Processing According to Second Embodiment: Dragon Shooting Game)

FIG. 9B is a flowchart illustrating another example of the game processing performed by the CPU 311 on the basis of the game program 70. FIG. 7B is a diagram illustrating an example of a superimposed image that is shown during the game processing according to the present embodiment and in which virtual objects are superimposed on a taken image of the real world.

Processes at steps 201 to 203 are the same as the processes at steps 101 to 103 in FIG. 9A. In the present embodiment as well, similarly to the first embodiment, the water surface object 61 is set on the basis of the position of the marker 60.

At step 204, the CPU 311 locates the fishing rod object 62' at a predetermined position in the virtual space. Specifically, the fishing rod object 62' is substantially the same in configuration as the fishing rod object 62 but has the bomb portion 62d instead of the fishing hook portion 62c (see FIG. 7B). During the game processing, the bomb portion 62d can be separated from the other portion of the fishing rod object 62' at any position in the virtual space in accordance with an operation of the user.

At step 205, the CPU 311 determines whether or not the number of times the dragon object 65 has collided with the bomb portion 62d is equal to or higher than a defined number (e.g., one time, two times, or three times). The determination concerning the number of times of the collision is performed on the basis of information that is set at subsequent step 209 on the basis of a result of a determination of collision between the dragon object 65 and the bomb portion 62d. When the number of times of the collision is equal to or higher than the defined number (Yes at step 205), the CPU 311 performs a dragon disappearing representation defined at step 212. On the other hand, when the number of times of the collision is less than the defined number (No at step 205), the CPU 311 proceeds to a process at step 206.

At step 206, the CPU 311 determines whether or not the dragon object 65 is in a state of having the portion 65a projecting upward from the upper surface of the water surface object 61 corresponding to the water surface. As described above, the dragon object 65 is controlled such that the dragon object 65 moves along the water surface displayed on the upper LCD 22 and also along the y axis of the marker coordinate system. In the game processing, when the dragon object 65 is in the state of having the portion 65a (see FIG. 7B) projecting upward from the upper surface of the water surface object 61 corresponding to the water surface, the user can attack the dragon object 65 with the bomb portion 62d.

At step 207, the CPU 311 determines whether or not the user has separated the bomb portion 62d from the fishing rod object 62' and has dropped the bomb portion 62d toward the water surface by performing an operation of moving the game apparatus 10 relative to the marker 60. When the bomb portion 62d has been separated (Yes at step 208), the CPU 311 performs a process defined at step 208. On the other hand, when the bomb portion 62d has not been separated (No at step 207), there is no need to consider the correlation between the dragon object 65 and the bomb portion 65d, and thus the CPU 311 proceeds to a process concerning update of the positions and the orientations of the virtual objects, defined at step 210.

At step 208, the CPU 311 performs a determination of collision between virtual objects, that is, the dragon object 65 and the bomb portion 62d. When it is determined that the dragon object 65 and the bomb portion 62d have collided with each other (Yes at step 208), the CPU 311 performs a process defined at step 209. On the other hand, when it is determined that the dragon object 65 and the bomb portion 62d have not collided with each other (No at step 208), the CPU 311 proceeds to the process concerning update of the positions and the orientations of the virtual objects, defined at step 210.

At step 209, the CPU 311 sets the internal state in the progress of the game as a collision state. The collision state includes information such as the number of times of collision, and in the subsequent game processing, a representation or the like based on the information are performed.

At step 210, the CPU 311 updates the position and the orientation of each virtual object so as to reflect an operation performed by the user on the game apparatus 10, as described above.

At step 211, the CPU 311 determines whether or not an end condition is satisfied. This is the same process as that at step 111 in the flow shown in FIG. 9A.

At step 212, as a result of determining at step 205 that the number of times of the collision is equal to or higher than the defined number, the CPU 311 performs a representation in which the dragon disappears in the progress of the game and which indicates that a mission provided in the game is cleared.

At step 213, in accordance with the internal state and the determination results in the game processing, the CPU 311 performs a rendering process of sequentially rendering a superimposed image in which an image including the virtual objects is superimposed on a taken image of the real world.

(One Example of Effect Provided by Second Embodiment)

The game apparatus 10 changes the positional relation of either of the player object or the non-player object or both of them with respect to the virtual surface. Thus, feelings such as an immersed feeling and a reality feeling that are further enhanced can be provided to the user.

(Modifications)

In the embodiments described above, the position and the orientation of the marker 60 included in the real world image are recognized, and the virtual objects are synthesized with the real world image in accordance with the recognition result. However, in another embodiment, instead of the marker 60, the position and/or the orientation of any recognition target may be recognized, and the virtual objects may be synthesized with the real world image in accordance with the recognition result. One example of the recognition target is a human face.

In the embodiments described above, the stereoscopic image is displayed on the upper LCD 22 on the basis of the real world image taken in real time by the outer imaging section 23. However, in another embodiment, a stereoscopic image may be displayed on the upper LCD 22 on the basis of data of a moving image previously taken by the outer imaging section 23, an external stereo camera, or the like.

In the embodiments described above, the outer imaging section 23 is previously mounted to the game apparatus 10. However, in another embodiment, an external camera detachable from the game apparatus 10 may be used.

In the embodiments described above, the upper LCD 22 is previously mounted to the game apparatus 10. However, in another embodiment, an external stereoscopic display detachable from the game apparatus 10 may be used.

In the embodiments described above, the virtual objects are synthesized with the real world image and displayed by using the game apparatus 10. However, in another embodiment, the virtual objects may be synthesized with the real world image and displayed by using any information processing apparatus or information processing system (e.g., a PDA (Personal Digital Assistant), a mobile phone, a personal computer, or a camera).

In the embodiments described above, the game processing is executed by using only one apparatus (the game apparatus 10). However, in another embodiment, a plurality of information processing apparatuses, included in an image display system, that can communicate with each other may share the execution of the game processing.

Recently, as a general trend, operating systems of typical computers are composed of various separate parts, called modules or functions; and offer a number of services via the separate parts. Further, in a commonly employed scheme, an application program calls such modules, if needed, for providing its service. In addition, software for general platforms is not always accompanied with such modules as a package; that is, it can be distributed without modules which are provided commonly in such platforms. Thus, software would be provided, which have been distributed without some modules or functions during the course of distribution thereof; and can offer a service which falls into the scope of the present invention, in connection with modules implemented in a computer executing the software. Such software can be distributed in various ways such as via computer network, in form of a storage medium having such software stored therein, and the like. Therefore, software or program deliberately provided in the above-mentioned manner, should be contemplated to fall into the scope of the above game program.

In the embodiments described above, a video see-through technique has been described in which a camera image taken by the outer imaging section 23 and virtual objects (e.g., the water surface object 61) are superimposed on each other and displayed on the upper LCD 22. However, the present invention is not limited thereto. For example, an optical see-through technique may be implemented. In the optical see-through technique, a display device that includes at least an imaging section and that is worn at the head of the user (hereinafter, referred to as head mounted display) is used. The user wearing the head mounted display can view the real space through a display section (screen) located at a position corresponding to a lens part of eye glasses. The display section is formed from a material that allows the user to view the real space therethrough. In addition, the display section allows an image of a virtual object generated by a computer to be displayed thereon. Further, the display section includes a liquid crystal display device or the like, and is configured to display an image of a virtual object generated by a computer, on the liquid crystal display device or the like and guide light from the liquid crystal display device to the user's retina (by reflecting the light by a half mirror or the like). Thus, the user can view an image in which the image of the virtual object is optically superimposed on the real space. A camera included in the head mounted display is used for detecting a marker located in the real space. Further, as another optical see-through technique, there is a technique in which a half mirror is not used and a transmissive liquid crystal display device is laminated on the display section. The present invention may use this technique. In this case, when an image of a virtual object is displayed on the transmissive liquid crystal display device, the image of the virtual object displayed on the transmissive liquid crystal display device is superimposed on the real space viewed through the display section, and the image of the virtual object and the real space are viewed by the user.

While the invention has been described in detail, the foregoing description is in all aspects illustrative and not restrictive. It is understood that numerous other modifications and variations can be devised without departing from the scope of the invention. It should be understood that the scope of the present invention is interpreted only by the scope of the claims. It is also understood that, from the description of specific embodiments of the present invention, the one skilled in the art can easily implement the present invention in the equivalent range based on the description of the present invention and on the common technological knowledge. Further, it should be understood that terms used in the present specification have meanings generally used in the art concerned unless otherwise specified. Therefore, unless otherwise defined, all the jargon and technical terms have the same meanings as those generally understood by one skilled in the art of the present invention. In the event of any conflict, the present specification (including meanings defined herein) has priority.

What is claimed is:

1. A non-transitory computer-readable storage medium having a game program stored therein, the game program causing a computer of a game apparatus, which is connected to an imaging device and a display device that allows a real space to be viewed on a screen thereof, to perform functionality comprising:

obtaining a taken image obtained by the imaging device taking an image of the real space;
detecting a specific object from the obtained taken image;
calculating an imaging device position of the imaging device with respect to the detected specific object;
setting a virtual camera in a virtual space on the basis of the imaging device position;
setting, on the basis of the imaging device position, a virtual surface in the virtual space and defining subspaces extending at least along a depth direction relative to the virtual surface in the virtual space;
providing, on the basis of a virtual camera position of the virtual camera, a first virtual object in a first subspace of the virtual space that is defined by the virtual surface;
generating a virtual object image by taking, by the virtual camera, the virtual space including the first virtual object;
displaying the virtual object image on the display device such that the virtual object image is superimposed on the real space on the screen and viewed by a user;
providing a second virtual object different from the first virtual object, in the virtual space in accordance with a progress of a game; and
controlling the progress of the game in accordance with changing a positional relation of either one of the first virtual object or the second virtual object or both of them with respect to the virtual surface.

2. The non-transitory computer-readable storage medium according to claim 1, wherein the game program further causes the computer to execute functionality comprising performing a determination of a condition concerning a correlation between the first virtual object and the second virtual object for subsequent game processing.

3. The non-transitory computer-readable storage medium according to claim 1, wherein when at least a part of the first virtual object that is present in the first subspace is moved through the virtual surface into a second subspace that is farther away from the virtual camera than the virtual surface, a determination of a condition concerning a correlation between the first virtual object and the second virtual object for subsequent game processing is performed.

4. The non-transitory computer-readable storage medium according to claim 3, wherein the condition concerning the correlation is that a positional relation of the first virtual object and the second virtual object satisfies a predetermined condition.

5. The non-transitory computer-readable storage medium according to claim 3, wherein the condition concerning the correlation is that a moving amount of the first virtual object that is defined on the basis of the obtained imaging device position reaches a predetermined value.

6. The non-transitory computer-readable storage medium according to claim 3, wherein the condition concerning the correlation is that even when a moving amount of the first virtual object that is defined on the basis of the obtained imaging device position does not reach a predetermined value, the specific object from the taken image is not detected.

7. A game apparatus having at least one processor and configured to be connected to an imaging device and a display device that allows a real space to be viewed on a screen thereof, the game apparatus configured to:

obtain a taken image obtained by the imaging device taking an image of the real space;
detect a specific object from the obtained taken image;
calculate an imaging device position of the imaging device with respect to the specific object on the basis of a detection result of the specific object;
set a virtual camera in a virtual space on the basis of the imaging device position;
set, on the basis of the imaging device position, a virtual surface in the virtual space and define subspaces extending at least along a depth direction relative to the virtual surface in the virtual space;

provide, on the basis of a position of the virtual camera, a first virtual object in a first subspace of the virtual space that is defined by the virtual surface;

generate a virtual object image by taking, by the virtual camera, the virtual space including the first virtual object;

display the virtual object image on the display device such that the virtual object image is superimposed on the real space on the screen and viewed by a user;

provide a second virtual object different from the first virtual object, in the virtual space in accordance with a progress of a game; and control the progress of the game in accordance with changing a positional relation of either one of the first virtual object or the second virtual object or both of them with respect to the virtual surface.

8. A game system comprising:
an imaging device;
a display device configured to allow a real space to be viewed on a screen of the display device; and
a game apparatus operatively coupled to the imaging device and the display device and configured to:
obtain a taken image obtained by the imaging device taking an image of the real space,
detect a specific object from the obtained taken image,
calculate an imaging device position of the imaging device with respect to the specific object on the basis of a detection result of the specific object,
set a virtual camera in a virtual space on the basis of the imaging device position,
set, on the basis of the imaging device position, a virtual surface in the virtual space and define subspaces extending at least along a depth direction relative to the virtual surface in the virtual space,
provide, on the basis of a position of the virtual camera, a first virtual object in a first subspace of the virtual space that is defined by the virtual surface,
generate a virtual object image by taking, by the virtual camera, the virtual space including the first virtual object,
display the virtual object image on the display device such that the virtual object image is superimposed on the real space on the screen and viewed by a user,
provide a second virtual object different from the first virtual object, in the virtual space in accordance with a progress of a game, and
control the progress of the game in accordance with changing a positional relation of either one of the first virtual object or the second virtual object or both of them with respect to the virtual surface.

9. A method for performing game processing in a game system having one or more processors, the method comprising:
obtaining a taken image obtained by taking an image of a real space the imaging device by an imaging device connected to the game system;
detecting a specific object from the obtained taken image;
calculating, via the one or more processors, an imaging device position of the imaging device with respect to the detected specific object;
setting a virtual camera in a virtual space on the basis of the imaging device position;
setting, on the basis of the imaging device position, a virtual surface in the virtual space and defining subspaces extending at least along a depth direction relative to the virtual surface in the virtual space;
providing, on the basis of a position of the virtual camera, a first virtual object in a first subspace of the virtual space that is defined by the virtual surface;
generating a virtual object image by taking, by the virtual camera, the virtual space including the first virtual object;
displaying the virtual object image on a display device connected to the game system, such that the virtual object image is superimposed on the real space on a screen of the display device and viewed by a user;
providing a second virtual object different from the first virtual object, in the virtual space in accordance with a progress of a game; and
controlling the progress of the game in accordance with changing a positional relation of either one of the first virtual object or the second virtual object or both of them with respect to the virtual surface.

10. A game system connected to an imaging device and a display device that allows a real space to be viewed on a screen thereof, the game system comprising:
a marker having a feature of serving as a specific object; and
a processing system having at least one processor, the processing system configured to:
obtain a taken image obtained by the imaging device taking an image of the real space;
detect the specific object from the obtained taken image;
calculate an imaging device position of the imaging device with respect to the specific object on the basis of a detection result of the specific object;
set a virtual camera in a virtual space on the basis of the imaging device position;
set, on the basis of the imaging device position, a virtual surface in the virtual space and define subspaces extending at least along a depth direction relative to the virtual surface in the virtual space;
provide, on the basis of a position of the virtual camera, a first virtual object in a first subspace of the virtual space that is defined by the virtual surface;
generate a virtual object image by taking, by the virtual camera, the virtual space including the first virtual object;
display the virtual object image on the display device such that the virtual object image is superimposed on the real space on the screen and viewed by a user;
provide a second virtual object different from the first virtual object, in the virtual space in accordance with a progress of a game; and
control the progress of the game in accordance with changing a positional relation of either one of the first virtual object or the second virtual object or both of them with respect to the virtual surface.

11. The non-transitory computer-readable storage medium according to claim 1, wherein the real space exists in a real world environment and the virtual space exists in a virtual gaming environment.

12. The non-transitory computer-readable storage medium according to claim 1, wherein the virtual surface represents a three-dimensional virtual surface extending along a first axis, a second axis, and a third axis in the virtual space.

13. The non-transitory computer-readable storage medium according to claim 12, wherein
the first axis extends along a longitudinal direction, the second axis extends along a latitudinal direction, and the third axis extends along the depth direction in the virtual space, and
the subspaces are defined in the third axis extending along the depth direction in the virtual space.

* * * * *